US008345297B2

(12) United States Patent
Kawabuchi et al.

(10) Patent No.: US 8,345,297 B2
(45) Date of Patent: Jan. 1, 2013

(54) DATA COMMUNICATION SYSTEM INCLUDING ADDRESS MANAGEMENT APPARATUS AND DATA COMMUNICATION APPARATUS, ADDRESS MANAGEMENT METHOD USING ADDRESS MANAGEMENT APPARATUS, AND ADDRESS MANAGEMENT PROGRAM CONTROLLING ADDRESS MANAGEMENT APPARATUS

(75) Inventors: Yoichi Kawabuchi, Itami (JP); Toshiya Shozaki, Osaka (JP); Junichi Hase, Osaka (JP); Keisuke Teramoto, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1037 days.

(21) Appl. No.: 12/274,767

(22) Filed: Nov. 20, 2008

(65) Prior Publication Data
US 2009/0135446 A1    May 28, 2009

(30) Foreign Application Priority Data

Nov. 27, 2007 (JP) ................................. 2007-306061

(51) Int. Cl.
*G06K 15/00* (2006.01)
(52) U.S. Cl. ..................................................... 358/1.16
(58) Field of Classification Search ........................ None
See application file for complete search history.

(56) References Cited

U.S. PATENT DOCUMENTS

2003/0043195 A1* 3/2003 Kling et al. ................... 345/766
2006/0190626 A1* 8/2006 Bhogal et al. ................ 709/248
2008/0133677 A1* 6/2008 Pattabhiraman et al. ..... 709/206

FOREIGN PATENT DOCUMENTS

| JP | 05-053944 | 3/1993 |
| JP | 11-055482 | 2/1999 |
| JP | 2001-285520 | 10/2001 |

(Continued)

OTHER PUBLICATIONS

Notification of the First Office Action issued in the corresponding Chinese Patent Application No. 200810179107.1 dated May 12, 2010, and an English Translation thereof.
Notice of Ground of Rejection issued in the corresponding Japanese Patent Application No. 2007-306061 dated Dec. 15, 2009, and an English Translation thereof.

(Continued)

*Primary Examiner* — Benny Q Tieu
*Assistant Examiner* — Jeremiah Bryar
(74) *Attorney, Agent, or Firm* — Buchanan Ingersoll & Rooney PC

(57) ABSTRACT

In order to facilitate updating of information on a destination of data, a data communication system includes a server and an MFP capable of communicating with each other. The MFP transmits to the server an update requesting signal including a source address of an e-mail received from another apparatus and related information on the source, transmits an address request to the server and receives user address data from the server, and transmits data to at least one destination address included in the received user address data. The server stores the user address data having destination addresses and related information on the destinations associated with each other, and in receipt of the update requesting signal from the MFP, rewrites the related information associated with the source address included in the update requesting signal by the user address data with the related information included in the update requesting signal.

18 Claims, 16 Drawing Sheets

FOREIGN PATENT DOCUMENTS

| | | |
|---|---|---|
| JP | 2001-356984 | 12/2001 |
| JP | 2004-088614 A | 3/2004 |
| JP | 2004-228974 | 8/2004 |
| JP | 2006-020049 | 1/2006 |
| JP | 2006-229419 A | 8/2006 |

OTHER PUBLICATIONS

Office Action (Notice of Ground of Rejection) dated Feb. 22, 2011, issued in the corresponding Japanese Patent Application No. 2007-306061, and an English Translation thereof.

* cited by examiner

| NO | USER IDENTIFICATION INFORMATION | USER NAME | TYPE | DESTINATION ADDRESS | RELATED INFORMATION ||||
|---|---|---|---|---|---|---|---|---|
| | | | | | COMMUNICATION RESOLUTION | ORIGINAL'S WIDTH | CODING SCHEME | S/MIME CERTIFICATE |
| 001 | A001 | AAA | IFAX | aaa@aaa.com | 600 | A4 | MMR | — |
| 002 | A001 | BBB | MAIL | bbb@bbb.com | — | — | — | XXXXX |

| NO | USER NAME | TYPE | DESTINATION ADDRESS | RELATED INFORMATION ||||
|---|---|---|---|---|---|---|---|
| | | | | COMMUNICATION RESOLUTION | ORIGINAL'S WIDTH | CODING SCHEME | S/MIME CERTIFICATE |
| 001 | AAA | IFAX | aaa@aaa.com | 600 | A4 | MMR | — |
| 002 | CCC | IFAX | ccc@ccc.com | 200 | A4 | MMR | — |

DATA COMMUNICATION SYSTEM INCLUDING ADDRESS MANAGEMENT APPARATUS AND DATA COMMUNICATION APPARATUS, ADDRESS MANAGEMENT METHOD USING ADDRESS MANAGEMENT APPARATUS, AND ADDRESS MANAGEMENT PROGRAM CONTROLLING ADDRESS MANAGEMENT APPARATUS

This application is based on Japanese Patent Application No. 2007-306061 filed with Japan Patent Office on Nov. 27, 2007, the entire content of which is hereby incorporated by reference.

BACKGROUND OF THE INVENTION

1. Field of the Invention

The present invention relates to a data communication system, an address management apparatus, a data communication apparatus, an address management method, and an address management program. More particularly, the present invention relates to a data communication system which transmits data to a destination address stored in advance, an address management apparatus and a data communication apparatus included in the data communication system, and an address management method and an address management program executed thereby.

2. Description of the Related Art

Recently, multi function peripherals (hereinafter, referred to as "MFPs") are capable of transmitting data by various communication methods including facsimile, e-mail, Internet facsimile, FTP and others. The MFP prestores address data associating names of destinations with their addresses, to facilitate designation of a destination. Once the user designates the name of the destination, the address of the destination is set to allow data to be transmitted thereto. When the MFP is used by a plurality of users and a single set of address data is stored in the MFP, the address data set is shared by the plurality of users. In this case, if the respective users cause the MFP to store address records, the number of address records increases, rendering selection of a desired address record difficult. Thus, there is known a technique to manage the address data for each user.

Further, in the apparatus to which data is to be transmitted, specifications of the data that can be received and output by the apparatus, including resolution, size, coding scheme and others, are predetermined. As such, data needs to be transmitted in accordance with the specifications corresponding to the destination apparatus. Further, it may be necessary to encrypt data with a public key determined by a receiver before transmission, in case of data leakage. When the specifications of data and the public key are included in the address data, once the name of the destination is designated, the data may be transmitted in accordance with the specifications the apparatus at the destination can receive and output, or the data may be transmitted which is encrypted by the public key determined by the receiver.

In the case where the address data is managed for each user, however, there may be a plurality of pieces of address data having the same destination but managed by different users. In such a case, the specifications of data to be transmitted or the public key for encryption will need to be registered for respective ones of the address data of the respective users.

Further, in the case where the MFP stores address data shared by a plurality of users, a plurality of MFPs may each store the address data including the same destination. In such a case, even if the specifications of data and/or the public key for encryption included in the address data in one MFP are updated, those in the address data including the same destination stored in another MFP are not updated. That is, updating of the specifications and/or the public key needs to be carried out in each of the MFPs.

SUMMARY OF THE INVENTION

The present invention has been accomplished in view of the foregoing problems, and an object of the present invention is to provide a data communication system which facilitates updating of information on a destination of data.

Another object of the present invention is to provide an address management apparatus which facilitates updating of the information on the destination of data.

A further object of the present invention is to provide a data communication apparatus which facilitates updating of the information on the destination of data.

Yet another object of the present invention is to provide an address management method which facilitates updating of the information on the destination of data.

Yet another object of the present invention is to provide an address management program which facilitates updating of the information on the destination of data.

In order to achieve the above objects, according to an aspect of the present invention, a data communication system includes an address management apparatus and a data communication apparatus capable of communicating with each other, wherein the address management apparatus includes: a destination storage portion to store address data having a destination address indicating an address of a destination and related information on the destination associated with each other, wherein the data communication apparatus includes: a data receiving portion to receive data from another apparatus; an update requesting portion to transmit an update request to the address management apparatus, the update request including a source address indicating an address of a source of the data received by the data receiving portion and related information on the source included in the data; an address data acquiring portion to transmit an address request to the address management apparatus and receive the address data from the address management apparatus; and a data transmitting portion to transmit data to the destination address included in the received address data, and wherein the address management apparatus further includes: an updating portion, in response to reception of the update request from the data communication apparatus, to rewrite the related information associated with the source address included in the update request by the address data stored in the destination storage portion with the related information included in the update request.

According to another aspect of the present invention, an address management apparatus capable of communicating with a data communication apparatus includes: a destination storage portion to store address data having a destination address indicating an address of a destination and related information on the destination associated with each other; an update request receiving portion to receive an update request from the data communication apparatus, the data communication apparatus transmitting the update request in response to reception of data from another apparatus, the update request including a source address indicating an address of a source of the data received by the data communication apparatus from the other apparatus and related information on the source included in the data; and an updating portion, in response to reception of the update request, to rewrite the related information associated with the source address included in the update request by the address data stored in the destination storage portion with the related information included in the update request.

According to a further aspect of the present invention, a data communication apparatus capable of communicating with an address management apparatus includes: a data receiving portion to receive data from another apparatus; an update requesting portion to transmit an update request to the address management apparatus, the update request including a source address indicating an address of a source of the data received by the data receiving portion and related information included in the data; an address data acquiring portion to transmit an address request to the address management apparatus and receive address data stored in the address management apparatus from the address management apparatus, the address data having a destination address indicating an address of a destination and related information on the destination associated with each other; a local storage portion to store local address data having a destination address indicating an address of a destination and related information on the destination associated with each other; a first local updating portion, in response to reception of data by the data receiving portion, to rewrite the related information associated with a source address indicating an address of a source of the received data by the local address data stored in the local storage portion with related information included in the received data; a second local updating portion, in response to reception of the address data from the address management apparatus by the address data acquiring portion, to rewrite the related information associated with the destination address included in the received address data by the local address data stored in the local storage portion with the related information associated with the destination address by the received address data; and a data transmitting portion to transmit data to the destination address included in the received address data or the local address data.

According to yet another aspect of the present invention, an address management method is carried out by an address management apparatus capable of communicating with a data communication apparatus, wherein the method includes the steps of: storing address data having a destination address indicating an address of a destination and related information on the destination associated with each other; receiving an update request from the data communication apparatus, the data communication apparatus transmitting the update request in response to reception of data from another apparatus, the update request including a source address indicating an address of a source of the data received from the other apparatus by the data communication apparatus and related information on the source included in the data; and in response to reception of the update request, rewriting the related information associated with the source address included in the update request by the stored address data with the related information included in the update request.

According to yet another aspect of the present invention, an address management method is carried out by a data communication apparatus capable of communicating with an address management apparatus, wherein the method includes the steps of: receiving data from another apparatus; transmitting an update request to the address management apparatus, the update request including a source address indicating an address of a source of the received data and related information included in the data; transmitting an address request to the address management apparatus and receiving address data stored in the address management apparatus from the address management apparatus, the address data having a destination address indicating an address of a destination and related information on the destination associated with each other; storing local address data having a destination address indicating an address of a destination and related information on the destination associated with each other; in response to reception of the data from the other apparatus, rewriting the related information associated with a source address indicating an address of a source of the received data by the stored local address data with related information included in the received data; in response to reception of the address data from the address management apparatus, rewriting the related information associated with the destination address included in the received address data by the stored local address data with the related information associated with the destination address by the received address data; and transmitting data to the destination address included in the received address data or the local address data.

According to yet another aspect of the present invention, an address management program is embodied on a computer readable medium and executed by a computer controlling an address management apparatus capable of communicating with a data communication apparatus, wherein the program causes the computer to perform processing including the steps of: storing address data having a destination address indicating an address of a destination and related information on the destination associated with each other; receiving an update request from the data communication apparatus, the data communication apparatus transmitting the update request in response to reception of data from another apparatus, the update request including a source address indicating an address of a source of the data received from the other apparatus by the data communication apparatus and related information on the source included in the data; and in response to reception of the update request, rewriting the related information associated with the source address included in the update request by the stored address data with the related information included in the update request.

According to yet another aspect of the present invention, an address management program is embodied on a computer readable medium and executed by a computer controlling a data communication apparatus capable of communicating with an address management apparatus, wherein the program causes the computer to perform processing including the steps of: receiving data from another apparatus; transmitting an update request to the address management apparatus, the update request including a source address indicating an address of a source of the received data and related information included in the data; transmitting an address request to the address management apparatus and receiving address data stored in the address management apparatus from the address management apparatus, the address data having a destination address indicating an address of a destination and related information on the destination associated with each other; storing local address data having a destination address indicating an address of a destination and related information on the destination associated with each other; in response to reception of the data from the other apparatus, rewriting the related information associated with a source address indicating an address of a source of the received data by the stored local address data with related information included in the received data; in response to reception of the address data from the address management apparatus, rewriting the related information associated with the destination address included in the received address data by the stored local address data with the related information associated with the destination address by the received address data; and transmitting data to the destination address included in the received address data or the local address data.

BRIEF DESCRIPTION OF THE DRAWINGS

FIG. 6 shows an example of the format of a user record included in user address data.

FIG. 8 shows an example of the format of a local record included in local address data.

DESCRIPTION OF THE PREFERRED EMBODIMENTS

Figure 1:
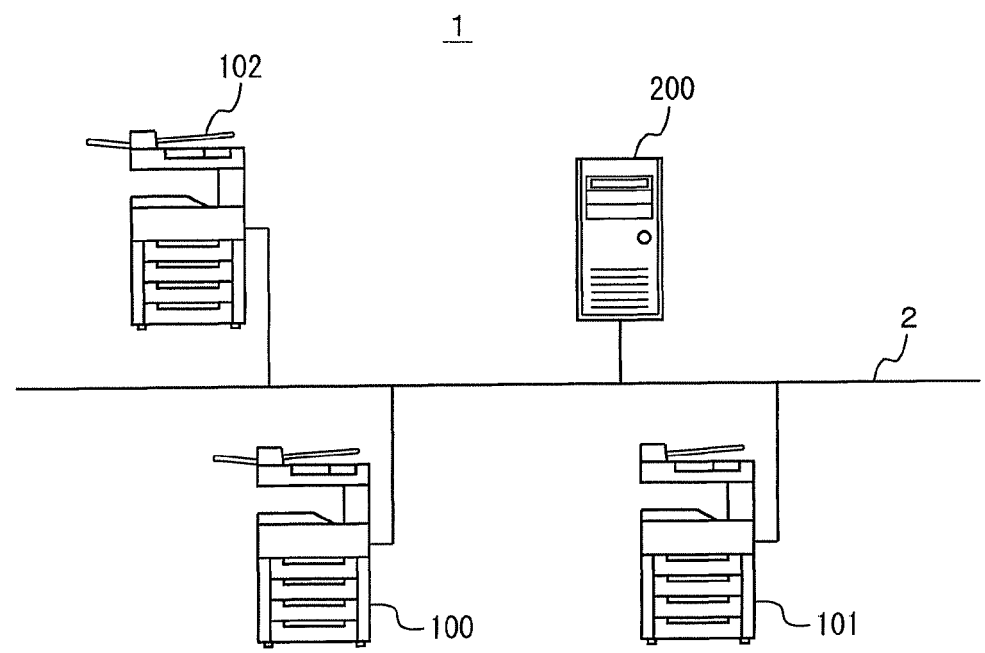
FIG. 1 is a schematic diagram of a data communication system according to an embodiment of the present invention.

Embodiment of the present invention will now be described with reference to the drawings. In the following description, like reference characters denote like parts, which have like names and functions, and therefore, detailed description thereof will not be repeated.

FIG. 1 schematically shows a data communication system according to an embodiment of the present invention. Referring to FIG. 1, a data communication system 1 includes MFPs (Multi Function Peripherals) 100, 101 and 102 serving as data communication apparatuses, and a server 200 serving as an address management apparatus, which are connected to a network 2.

Network 2 is a local area network (LAN), which is connected to the Internet via a gateway. Network 2 may be connected in a wired or wireless manner. Further, not limited to the LAN, network 2 may be a network using public switched telephone networks, a wide area network (WAN), the Internet, or the like.

Server 200 is a typical computer. MFPs 100, 101 and 102 are each installed with a mail transmission/reception program for transmitting/receiving e-mails, and are capable of transmitting/receiving e-mails through an e-mail server connected to the Internet.

MFPs 100, 101 and 102 each include a scanner for reading an original, an image forming device for forming an image on a recording medium such as a sheet of paper based on image data, and a facsimile machine, and have an image reading function, copying function, and facsimile transmitting/receiving function. While MFPs 100, 101 and 102 are described by way of example in the present embodiment, the data communication apparatus may be, not limited to MFPs 100, 101 and 102, any apparatus having the function of transmitting/receiving e-mails, such as a printer, facsimile machine, personal computer, and the like. MFPs 100, 101 and 102 are identical in function, and thus, MFP 100 will be explained representatively in the following, unless otherwise stated.

Figure 2:
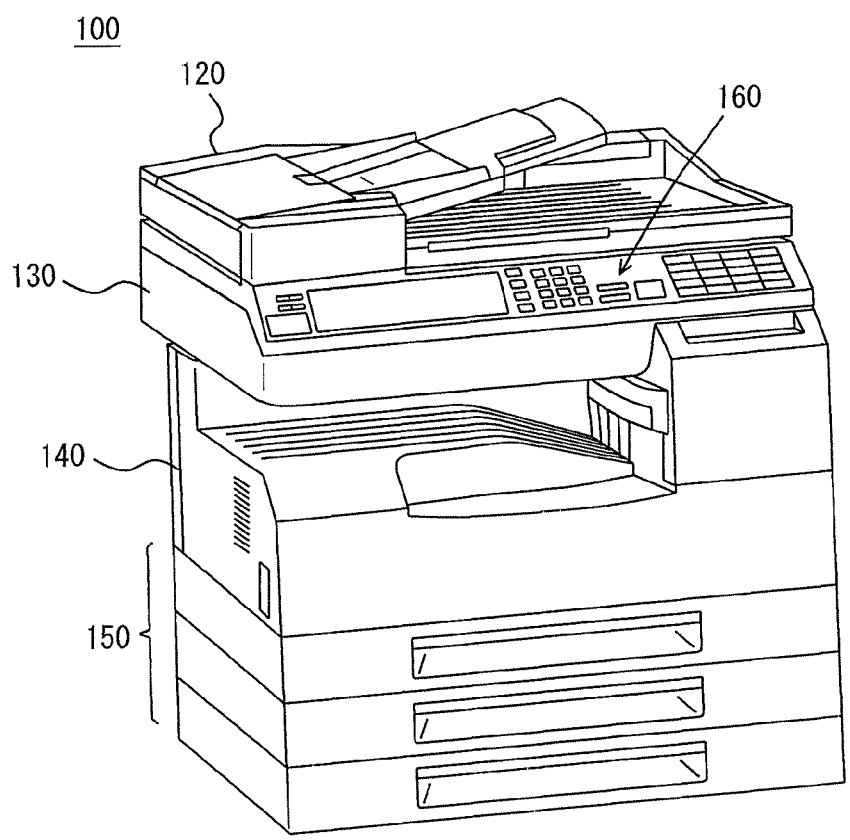
FIG. 2 is a perspective view of an MFP.
Figure 3:
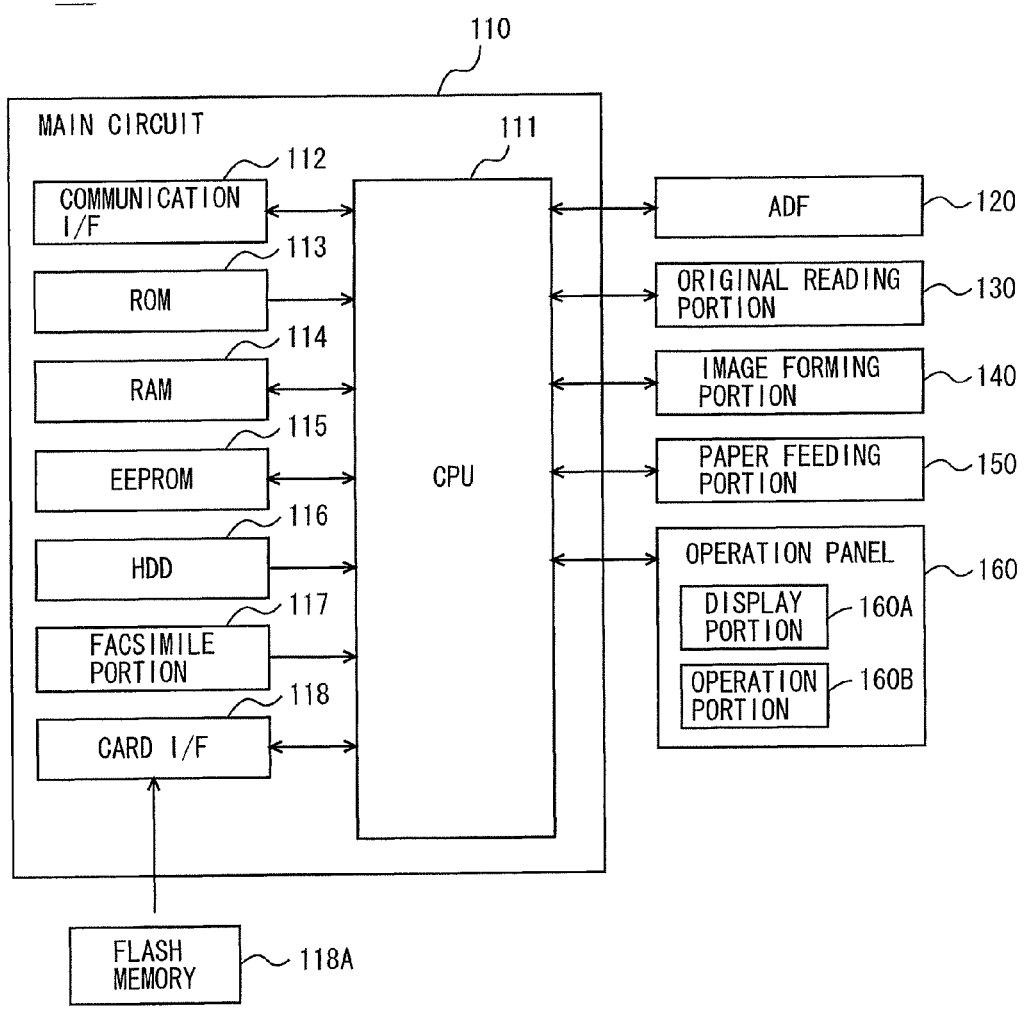
FIG. 3 is a block diagram showing an example of the hardware configuration of the MFP.

FIG. 2 is a perspective view of the MFP, and FIG. 3 is a block diagram showing an example of the hardware configuration of the MFP. Referring to FIGS. 2 and 3, MFP 100 includes: a main circuit 110; an original reading portion 130 which reads an original; an automatic document feeder (ADF) 120 which delivers an original to original reading portion 130; an image forming portion 140 which forms an image on a sheet of paper or the like based on image data output by original reading portion 130 that read an original; a paper feeding portion 150 which supplies sheets of paper to image forming portion 140; and an operation panel 160 serving as a user interface. Main circuit 110 includes a central processing unit (CPU) 111, a communication interface (I/F) portion 112, a ROM (Read Only Memory) 113, a RAM (Random Access Memory) 114, an EEPROM (Electronically Erasable Programmable ROM) 115, a hard disk drive (HDD) 116 as a mass storage, a facsimile portion 117, and a card interface (I/F) 118 mounted with a flash memory 118A. CPU 111 is connected with ADF 120, original reading portion 130, image forming portion 140, paper feeding portion 150, and operation panel 160, and is responsible for overall control of MFP 100.

ROM 113 stores a program executed by CPU 111 or data necessary for execution of the program. RAM 114 is used as a working area when CPU 111 executes a program.

Operation panel 160 is provided on an upper surface of MFP 100, and includes a display portion 160A and an operation portion 160B. Display portion 160A is a display such as a liquid crystal display (LCD), an organic electro-luminescence display (ELD) or the like, and displays an instruction menu for the user, information about acquired image data, and others. Operation portion 160B is provided with a plurality of keys, and accepts input of data such as instructions, characters and numerical characters, according to the key operations of the user. Operation portion 160B further includes a touch panel provided on display portion 160A.

Communication I/F 112 is an interface for connecting MFP 100 to network 2. CPU 111 communicates with MFP 101, MFP 102, or server 200 via communication I/F 112, for transmission/reception of data. Further, communication I/F 112 is capable of communicating with a computer connected to the Internet via network 2. Further, communication I/F 112 transmits/receives e-mails to/from an e-mail server.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits the same to a facsimile machine connected to the PSTN.

Card I/F 118 is mounted with flash memory 118A. CPU 111 can access flash memory 118A via card I/F 118. CPU 111 loads a program recorded on flash memory 118A mounted to card I/F 118, to RAM 114 for execution. It is noted that the program executed by CPU 111 is not restricted to the program recorded on flash memory 118A. It may load a program stored in HDD 116 to RAM 114 for execution. In this case, another computer connected to network 2 may rewrite the program stored in HDD 116 of MFP 100 or may additionally write a new program. Further, MFP 100 may download a program from another computer connected to network 2, and store the program in HDD 116. As used herein, the "program" includes, not only the program directly executable by CPU 111, but also a source program, a compressed program, an encrypted program, and others.

Figure 4:
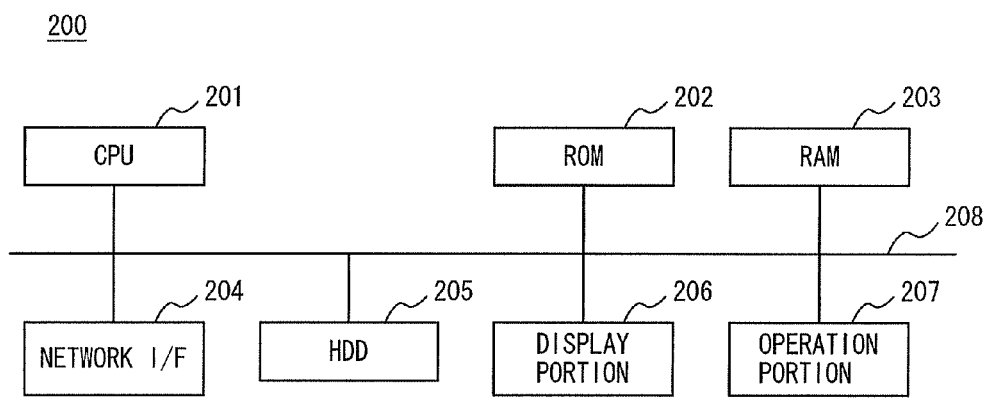
FIG. 4 is a block diagram showing an example of the hardware configuration of a server.

FIG. 4 is a block diagram showing an example of the hardware configuration of server 200. Referring to FIG. 4, server 200 includes: a CPU 201 which is responsible for overall control of server 200; a ROM 202 which stores a program executed by CPU 201 and the like; a RAM 203 used as a work area for CPU 201; a network I/F 204 which connects server 200 to network 2; an HDD 205 as a mass storage; a display portion 206; and an operation portion 207 which accepts an input of a user's operation.

In data communication system 1 according to the present embodiment, each of MFPs 100, 101 and 102 stores address data in which at least one destination address as a destination of data is associated with related information on the corresponding destination. Further, server 200 stores address data for each user. Herein, the address data stored in each of MFPs 100, 101 and 102 is called "local address data", and the address data stored for each user in server 200 is called "user address data". The local address data stored in MFPs 100, 101 and 102 can be accessed by a plurality of users using MFPs 100, 101 and 102, respectively, and shared by the users. For example, when a user A logs into MFP 100, MFP 100 transmits user identification information for identification of the user A to server 200, and downloads the user address data stored in server 200 for the user A from server 200. This allows the user A to use the local address data stored in MFP 100 as well as the user address data for the user A downloaded from server 200 by MFP 100.

Figure 5:
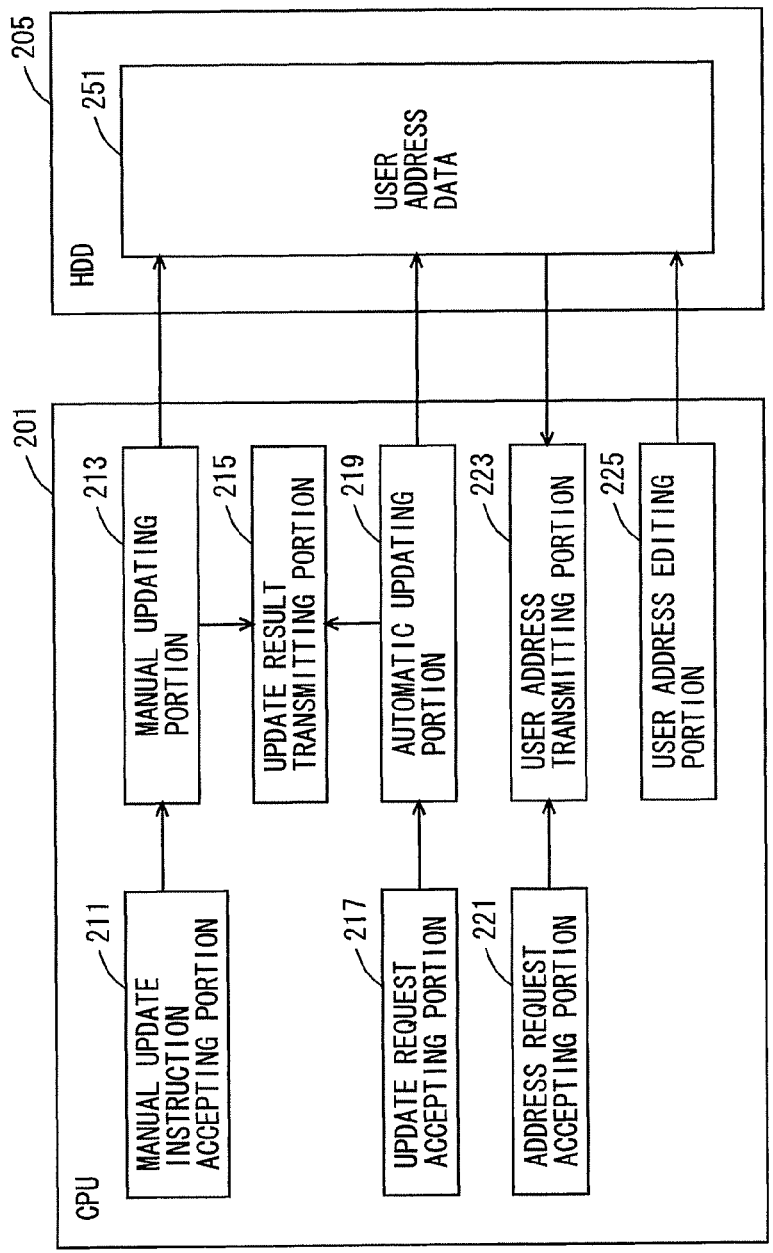
FIG. 5 is a functional block diagram showing an example of the function of a CPU provided in the server together with data stored in an HDD.

FIG. 5 is a functional block diagram showing an example of the function of the CPU provided in the server, together with data stored in the HDD. HDD 205 of server 200 stores user address data 251. User address data 251 includes user records for each user. Each user record has a destination address indicating a destination and related information associated with each other.

FIG. 6 shows an example of the format of the user record included in the user address data. Referring to FIG. 6, the user record includes fields of: "NO", "user identification information", "user name", "type", "destination address", and "related information". In the "NO" field, the number for specifying the user record included in the user address data is set.

In the "user identification information" field, the user identification information for identification of the user associated with the relevant address record is set. In the "user name" field, the name of the user as a destination is set, which is a full name of the user in this example. In the "type" field, the type of communication method used for transmitting data to the apparatus of the destination is set. Here, in the "type" field, either "MAIL" indicating e-mail or "IFAX" indicating Internet facsimile is set as the communication method, although another communication method may be set instead. In the "destination address" field, the address of the destination is set. Here, since the communication method is either e-mail or Internet facsimile, an e-mail address is set.

The "related information" field includes fields of: "communication resolution", "original's width", "coding scheme", and "S/MIME certificate". In the "communication resolution" field, resolution of data attached to an e-mail is set. In the "original's width" field, the size of the data attached to an e-mail is set. In the "coding scheme" field, the coding scheme for coding the data attached to an e-mail is set. In the "S/MIME (Secure Multipurpose Internet Mail Extension) certificate" field, a public key for encrypting the data attached to an e-mail by the RSA public key cryptosystem is set.

For the user record having its type set to "IFAX", the fields of "communication resolution", "original's width" and "coding scheme" in the related information are effective, while the field of "S/MIME certificate" is ineffective. More specifically, in the case where the e-mail address assigned to an Internet facsimile machine is set as a destination address in the "destination address" field, values are set for the respective fields of "communication resolution", "original's width" and "coding scheme", whereas no value is set for the field of "S/MIME certificate". In the figure, "-" indicates that nothing has been set therein.

For the user record having its type set to "MAIL", the field of "S/MIME certificate" is effective, while the fields of "communication resolution", "original's width" and "coding scheme" are ineffective. That is, in the case where the e-mail address not assigned to an Internet facsimile machine is set as a destination address in the "destination address" field, a value is set for the field of "S/MIME certificate", whereas no values are set for the fields of "communication resolution", "original's width" and "coding scheme".

Returning to FIG. 5, CPU 201 provided in server 200 includes: a manual update instruction accepting portion 211 which accepts a manual update instruction; a manual updating portion 213 which updates user address data 251 in accordance with a manual update instruction; an update request accepting portion 217 which accepts an update request; an automatic updating portion 219 which updates user address data 251 in accordance with an update request; an update result transmitting portion 215 which returns a result of updating of user address data 251; an address request accepting portion 221 which accepts an address request; a user address transmitting portion 223 which transmits user address data 251 in accordance with an address request; and a user address editing portion 225 which edits user address data 251.

Figure 7:
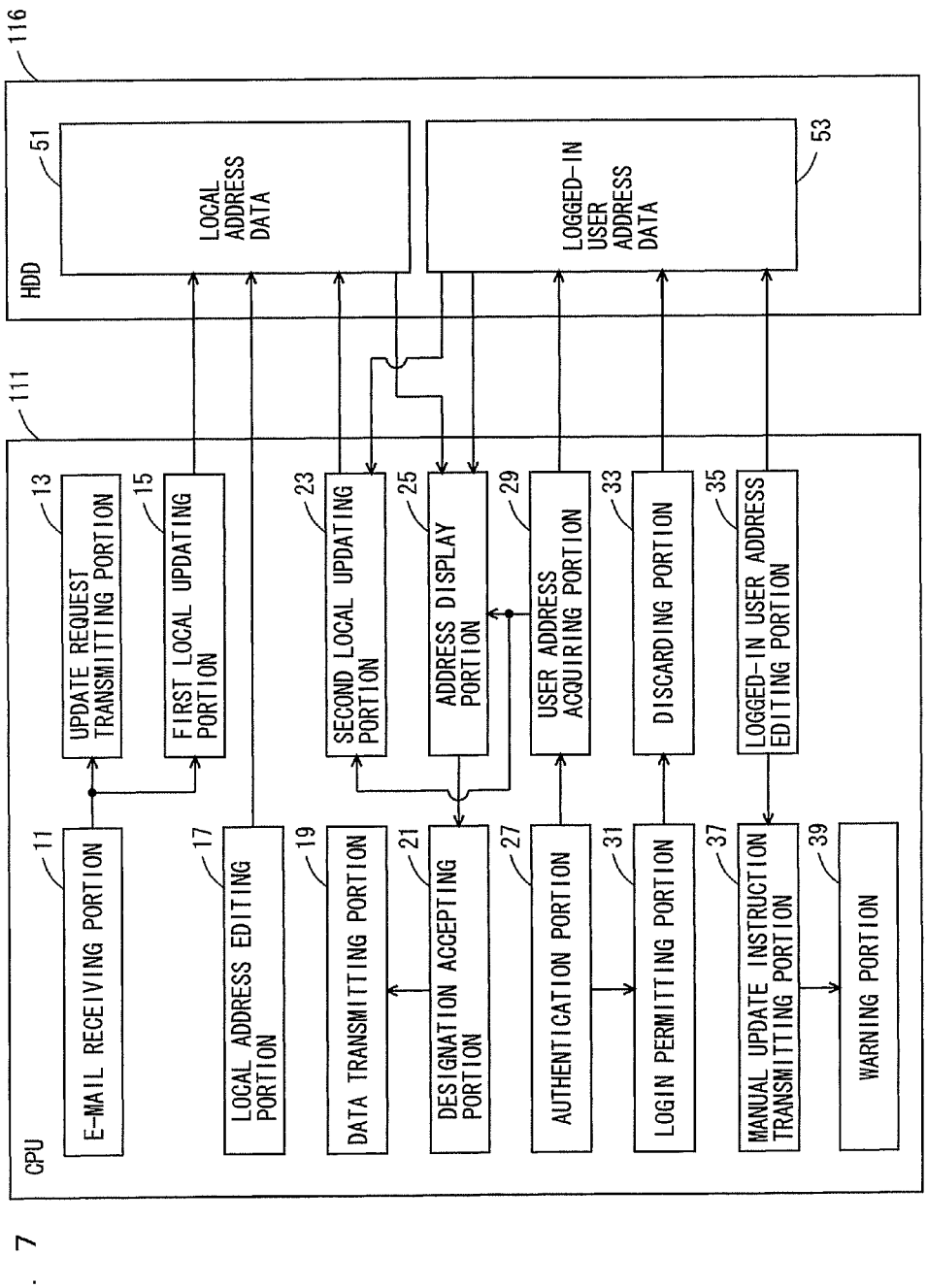
FIG. 7 is a functional block diagram showing an overview of the function of a CPU provided in the MFP together with data stored in an HDD.

FIG. 7 is a functional block diagram schematically showing the function of the CPU provided in the MFP, together with data stored in the HDD. Referring to FIG. 7, HDD 116 in MFP 100 stores local address data 51. A plurality of users using MFP 100 can access local address data 51. Local address data 51 includes local records. Each local record has a destination address indicating a destination and related information associated with each other.

FIG. 8 shows an example of the format of the local record included in the local address data. This is similar to the format of the user record, except that it does not include the "user identification information" field.

Returning to FIG. 7, CPU 111 provided in MFP 100 includes: an e-mail receiving portion 11 which receives an e-mail; a first local updating portion 15 which updates local address data 51 in response to reception of an e-mail; an update request transmitting portion 13 which transmits an update request to server 200; a local address editing portion 17 which edits local address data 51; an authentication portion 27 which authenticates a user; a login permitting portion 31 which permits login of an authenticated user; a user address acquiring portion 29 which acquires user address data 251 associated with an authenticated user from server 200 and store the same in HDD 116; a second local updating portion 23 which updates local address data 51 stored in HDD 116 based on acquired user address data; an address display portion 25 which displays user names of the destinations based on acquired user address data 251 and local address data 51; a designation accepting portion 21 which accepts designation of a user name as a destination from among the displayed user names; a data transmitting portion 19 which transmits data to a destination address associated with a designated user name; a discarding portion 33 which discards logged-in user address data 53 stored in HDD 116 in response to cancellation of permission by login permitting portion 31; a logged-in user address editing portion 35 which edits logged-in user address data 53 stored in HDD 116; a manual update instruction transmitting portion 37 which transmits to server 200 a manual update instruction including the edited user record in logged-in user address data 53; and a warning portion 39 which issues a warning when there is an error in manual update.

Hereinafter, operations of MFP 100 and server 200 will be described with reference to FIGS. 5 and 7. E-mail receiving portion 11 of CPU 111 provided in MFP 100 controls communication I/F 112 to receive an e-mail. Specifically, e-mail receiving portion 11 transmits a signal requesting download of an e-mail to an e-mail server via communication I/F 112, and when communication I/F 112 receives an e-mail transmitted from the e-mail server, e-mail receiving portion 11 acquires the e-mail from communication I/F 112. The IP (Internet Protocol) address of the e-mail server is stored in advance in HDD 116 or the like. E-mail receiving portion 11 transmits the signal requesting download at the time when login permitting portion 31 permits login, and also transmits the signal regularly. In receipt of an e-mail that requests address update (hereinafter, also referred to as an "address update-requesting e-mail"), e-mail receiving portion 11 outputs the received e-mail to update request transmitting portion 13 and first local updating portion 15. There is a predetermined format for the address update-requesting e-mail. If the communication method is Internet facsimile, it includes "communication resolution", "original's width" and "coding scheme" as the related information. In the case of the e-mail having the communication method other than Internet facsimile, it includes "S/MIME certificate" (public key).

If the received e-mail is not the one requesting address update, e-mail receiving portion 11 stores the e-mail in a predetermined area in HDD 116. Further, in the case of the e-mail having its communication method set to Internet facsimile, the data attached to the e-mail may be output to image forming portion 140 to cause it to form an image of the data on a sheet of paper.

First local updating portion 15 updates local address data 51 stored in HDD 116 based on the received e-mail requesting address update. More specifically, first local updating portion 15 extracts an e-mail address of the source and related information from the address update-requesting e-mail. It then searches local address data 51 stored in HDD 116 for the local record in which the e-mail address the same as the source e-mail address extracted from the address update-requesting e-mail is set in the "destination address" field. It then changes the values set for the fields of the related information in the extracted local record to those of the related information extracted from the address update-requesting e-mail. Local address data 51 is updated in this manner.

In response to reception of the address update-requesting e-mail, update request transmitting portion 13 transmits an update requesting signal to server 200. Specifically, it extracts a source e-mail address and related information from the address update-requesting e-mail, and generates an update requesting signal including them. It then outputs an instruction to communication I/F 112 to cause it to transmit the update requesting signal to server 200.

In server 200, the update requesting signal transmitted from MFP 100 is received by network I/F 204, which outputs the received update requesting signal to CPU 201. In CPU 201 provided in server 200, update request accepting portion 217 accepts the update requesting signal from network I/F 204, and outputs it to automatic updating portion 219.

In receipt of the update requesting signal from update request accepting portion 217, automatic updating portion 219 updates user address data 251 stored in HDD 205 based on the received update requesting signal. Specifically, automatic updating portion 219 searches user address data 251 stored in HDD 205, and extracts the user record having the e-mail address the same as the one included in the update requesting signal set in the "destination address" field.

Since user address data 251 stored in HDD 205 have destination addresses and related information associated with each other for each user, user address data 251 may include a plurality of user records that are identical in destination address and different in user identification information. That is, in user address data 251, there may be a plurality of user records having the e-mail address the same as the one included in the update requesting signal set in their respective "destination address" fields. In such a case, automatic updating portion 219 extracts all the relevant user records.

Next, automatic updating portion 219 changes the values in the fields of the related information in all of the extracted user records to those of the related information included in the update requesting signal. Automatic updating portion 219 then outputs the result of updating to update result transmitting portion 215.

As such, server 200 updates user address data 251 in receipt of an update requesting signal from any of MFPs 100, 101 and 102. This allows user address data 251 to be updated every time an address update-requesting e-mail is received in one of MFPs 100, 101 and 102, ensuring that user address data 251 is brought up to date. Further, in the case where there are a plurality of user records having the e-mail address the same as the one included in the update requesting signal set in their "destination address" fields, the values in the fields of the related information in each of the plurality of user records are changed to those of the related information included in the update requesting signal. Since the destination address and the related information have a one-to-one relationship, updating the related information of the plurality of user records having the same destination address at one time allows the related information of the user records for different users to be brought up to date together Further, user address editing portion 225 of CPU 201 in server 200 edits user address data 251 stored in HDD 205. Specifically, when a user address data editing button prepared in operation portion 207 is designated, user address editing portion 225 switches server 200 to a user address editing mode for editing user address data 251. Editing includes addition, modification and deletion of user records. User address editing portion 225 displays a user address editing screen on display portion 206, and adds, modifies or deletes user records in accordance with an operation input to operation portion 207 by the user. Upon input of a delete instruction with designation of user identification information, user address editing portion 225 deletes all the user records having the relevant user identification information set therefor from user address data 251.

In MFP 100, authentication portion 27 in CPU 111 authenticates the user operating MFP 100. Specifically, it accepts authentication information input to operation portion 160B by the user, and compares it with the authentication information prestored in HDD 116. Here, a password is used as the authentication information. With sets of passwords and user identification information for identification of users prestored in HDD 116, authentication portion 27 determines whether HDD 116 stores the same set as the set of user identification information and password input to operation portion 160B. If the password input to operation portion 160B matches one of the passwords prestored in HDD 116, authentication portion 27 authenticates the user. If not, it does not authenticate the user. In the case of authenticating the user, authentication portion 27 outputs the user identification information of the authenticated user to user address acquiring portion 29 and login permitting portion 31. Otherwise, it outputs a signal indicating authentication failure to login permitting portion 31.

In receipt of the user identification information from authentication portion 27, login permitting portion 31 permits login. When the login is permitted, the subsequent operation input to operation portion 160B is handled as the operation by the user specified by the user identification information input from authentication portion 27. Further, in receipt of a logout instruction input to operation portion 160B by the user, login permitting portion 31 cancels the permission of login by login permitting portion 31. In the case where the signal indicating authentication failure is input, i.e., when the user is not authenticated by authentication portion 27, he/she may be permitted to log in as a guest user.

In receipt of the user identification information from authentication portion 27, user address acquiring portion 29 transmits an address requesting signal including the user identification information to server 200. Specifically, user address acquiring portion 29 outputs an instruction to communication I/F 112 to cause it to transmit the address requesting signal to server 200.

In server 200, the address requesting signal transmitted from MFP 100 is received by network I/F 204. Network I/F 204 outputs to CPU 201 the received address requesting signal as well as the IP address assigned to the MFP 100 that issued the signal. Address request accepting portion 221 in CPU 201 accepts the address requesting signal and the IP address of MFP 100 from network I/F 204, and outputs them to user address transmitting portion 223. The IP address of MFP 100 is the device identification information for identification of MFP 100.

User address transmitting portion 223 searches user address data 251 stored in HDD 205, to extract the user records associated with the user identification information input from address request accepting portion 221, and transmits the extracted user records to MFP 100. Specifically, it outputs the extracted user records and the IP address of MFP 100 to network I/F 204, to cause it to transmit them.

In MFP 100, the user records transmitted from server 200 are received by communication I/F 112, which outputs the received user records to CPU 111 in MFP 100. User address acquiring portion 29 in CPU 111 accepts the user records from communication I/F 112, and stores them as logged-in user address data 53 in HDD 116, and also outputs a download completion signal, indicating that the user address data for the logged-in user has been acquired, to address display portion 25 and second local updating portion 23. In this manner, every time a user is authenticated by MFP 100 and his/her login is permitted, the user records associated with the logged-in user are acquired from user address data 251 stored in server 200. This ensures that every time a user logs into MFP 100, the user records are acquired from user address data 251 updated to the latest state in server 200 at that time point. This allows the latest user records to be acquired.

In receipt of the download completion signal from user address acquiring portion 29, second local updating portion 23 reads logged-in user address data 53 stored in HDD 116, and updates local address data 51 stored in HDD 116 based on logged-in user address data 53. Specifically, it sequentially selects the user records included in logged-in user address data 53, and for each of the selected user records, extracts from local address data 51 the local record having the destination address the same as the one set in the "destination address" field of the selected user record set therein. Then, if the values set in the fields of the related information of the extracted local record differ from the values set in the fields of the related information of the user record, it changes the values set in the fields of the related information in the local record to those set in the fields of the related information in the user record. As such, local address data 51 is updated every time the user records associated with the logged-in user are acquired from user address data 251 stored in server 200, which increases the frequency of updating of local address data 51, ensuring that it is brought up to date as far as possible.

In receipt of the download completion signal from user address acquiring portion 29, address display portion 25 reads logged-in user address data 53 and local address data 51 stored in HDD 116, and generates address data as a combination of the user records included in logged-in user address data 53 and the local records included in local address data 51, excluding any redundant records having the same destination address. It then generates a destination designation screen for displaying the values in the "user name" fields in the generated address data in the form of a list, and displays the screen on display portion 160A.

When the user inputs an instruction to designate a user name to operation portion 160B in accordance with the destination designation screen displayed on display portion 160A, designation accepting portion 21 outputs the user name specified by the instruction to data transmitting portion 19.

Data transmitting portion 19 receives the user name from designation accepting portion 21. Further, when the user inputs to operation portion 160B an instruction to designate data to be transmitted, data transmitting portion 19 acquires the designated data. The data may include the data output by original reading portion 130 that read an original, or the data stored in HDD 116.

Further, data transmitting portion 19 extracts the user record or local record having the input user name set in the "user name" field, from local address data 51 or logged-in user address data 53 stored in HDD 116. Data transmitting portion 19 processes the acquired data in accordance with the values set in the fields of the related information of the extracted user or local record, and generates and transmits an e-mail including the processed data.

More specifically, in the case where "IFAX" is set in the "type" field of the extracted user or local record, the values set in the "communication resolution", "original's width", and "coding scheme" fields of the related information are acquired. The data is changed to the one having the resolution and size determined by the values set in the "communication resolution" and "original's width" fields, and the resultant data is encoded with the coding scheme set in the "coding scheme" field. The e-mail having the encoded data as its attached file and the e-mail address set in the "destination address" filed as its destination is generated and transmitted. By comparison, in the case where "MAIL" is set in the "type" field of the extracted user or local record, the key information set in the "S/MIME certificate" field of the related information is acquired. The data is encrypted with the key information. Then, the e-mail having the encrypted data as its attached file and the e-mail address set in the "destination address" field as its destination is generated and transmitted.

The user only needs to select one of the displayed user names and designate data, to cause the destination address to be determined and the data to be transmitted. This simplifies the operations of the user.

When login permission by login permitting portion 31 is cancelled, discarding portion 33 discards logged-in user address data 53 stored in HDD 116. Specifically, it erases logged-in user address data 53 from HDD 116. This ensures that logged-in user address data 53 including the user records associated with the logged-in user is stored in HDD 116 only during the period when login of the logged-in user is permitted. When another user logs into MFP 100, the user records associated with the relevant user are downloaded from server 200, and are newly stored in HDD 116 as logged-in user address data 53.

Logged-in user address editing portion 35 performs editing of logged-in user address data 53 stored in HDD 116. If HDD 116 does not store logged-in user address data 53, logged-in user address editing portion 35 generates and stores logged-in user address data 53 in HDD 116. Specifically, when a logged-in user address data editing button prepared in operation portion 160B is designated, logged-in user address editing portion 35 switches MFP 100 to a logged-in user address editing mode for editing logged-in user address data 53.

Editing includes addition, modification and deletion of the logged-in user records. A logged-in user address editing screen is displayed on display portion 160A, and the logged-in user records are added, modified or deleted in accordance with the operations input by the user to operation portion 160B. Upon completion of the editing, logged-in user address editing portion 35 outputs the added, modified or deleted logged-in user record to manual update instruction transmitting portion 37. If there are two or more added, modified or deleted logged-in user records, it outputs all of them to manual update instruction transmitting portion 37.

In receipt of the added, modified or deleted logged-in user record from logged-in user address editing portion 35, manual update instruction transmitting portion 37 generates a manual update instruction signal including the received logged-in user record as well as the user identification information of the logged-in user, and transmits the manual update instruction signal to server 200. Specifically, it outputs an instruction to communication I/F 112 to cause it to transmit the manual update instruction signal to server 200.

In server 200, the manual update instruction signal transmitted from MFP 100 is received by network I/F 204, which then outputs the received manual update instruction signal as well as the IP address of MFP 100 to CPU 201 in server 200. Manual update instruction accepting portion 211 in CPU 201 accepts the manual update instruction signal and the IP address of MFP 100 from network I/F 204, and outputs them to manual updating portion 213.

In receipt of the manual update instruction signal and the IP address of MFP 100 from manual update instruction accepting portion 211, manual updating portion 213 updates user address data 251 stored in HDD 205 based on the received manual update instruction signal. Specifically, manual updating portion 213 searches user address data 251 stored in HDD 205, to extract the user record which is associated with the user identification information included in the manual update instruction signal and in which the e-mail address the same as the one set in the "destination address" field of the logged-in user record included in the manual update instruction signal is set in its "destination address" field. If such a user record is not extracted, a new user record is generated from the user identification information and the logged-in user record included in the manual update instruction signal, and is additionally stored in user address data 251. Further, an error signal is output to update result transmitting portion 215.

When the user record is extracted, manual updating portion 213 modifies or deletes the user record. For modification, it changes the values in the fields of the related information of the extracted user record to those set in the fields of the related information of the user record included in the manual update instruction signal. As a result of search of user address data 251 stored in HDD 205, if there is more than one user record in which the e-mail address the same as the one set in the "destination address" field of the logged-in user record included in the manual update instruction signal is set in the "destination address" field, the values in the fields of the related information in each of the plurality of user records may be changed to those set in the fields of the related information of the user record included in the manual update instruction signal.

When the error signal is input from manual updating portion 213, update result transmitting portion 215 transmits the error signal to MFP 100. Specifically, it outputs the error signal and the IP address of MFP 100 to network I/F 204, to cause it to transmit the error signal.

In MFP 100, the error signal transmitted from server 200 is received by communication I/F 112, which then outputs the received error signal to CPU 111 in MFP 100. Warning portion 39 in CPU 111 accepts the error signal from communication I/F 112. In receipt of the error signal from communication I/F 112, warning portion 39 issues a warning except the case where logged-in user address data 53 has been newly generated by logged-in user address editing portion 35. This is because, after downloading of the user address data associated with the logged-in user, the user address data that is supposed to be stored in server 200 has been deleted from server 200. For the warning, a warning message such as "The address data in the server has been deleted." may be displayed on display portion 160A. Alternatively, a warning sound may be output from a speaker, or the warning message and the warning sound may be output together. The warning allows the user to recognize that the user address data has been deleted in server 200.

Local address editing portion 17 edits local address data 51 stored in HDD 116. Specifically, when a local address data editing button prepared in operation portion 160B is designated, local address editing portion 17 switches MFP 100 to a local address editing mode for editing local address data 51. Editing may include addition, modification and deletion of the local records. A local address editing screen is displayed on display portion 160A, and the local records are added, modified or deleted in accordance with the operations input to operation portion 160B by the user.

Figure 9:
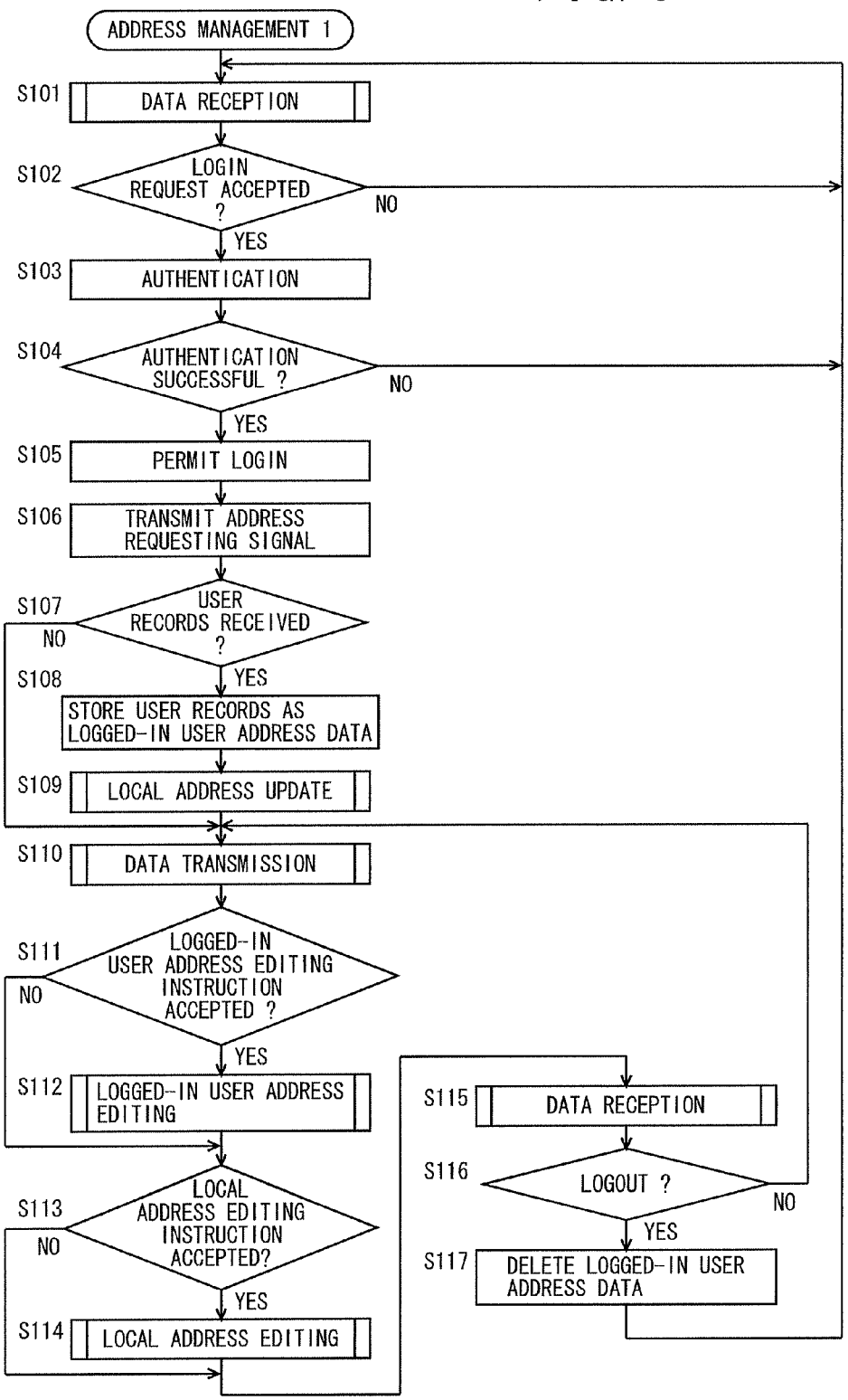
FIG. 9 is a flowchart illustrating an example of the flow of address management processing carried out in the MFP.

FIG. 9 is a flowchart illustrating an example of the flow of address management processing carried out in the MFP. The address management processing is carried out by CPU 111 as it executes an address management program. Referring to FIG. 9, CPU 111 executes data reception processing (step S101).

Figure 10:
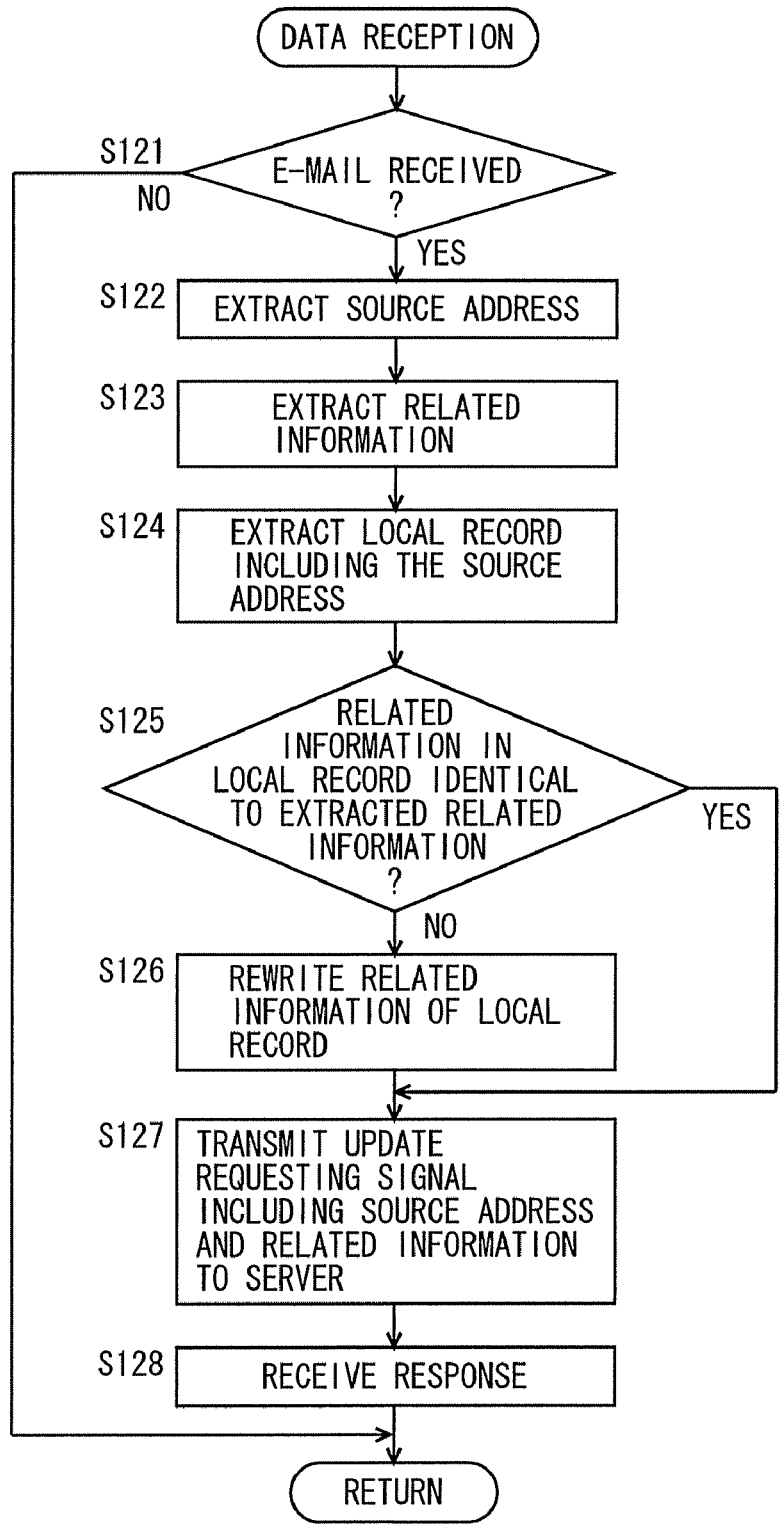
FIG. 10 is a flowchart illustrating an example of the flow of data reception processing.

FIG. 10 is a flowchart illustrating an example of the flow of the data reception processing. Referring to FIG. 10, CPU 111 determines whether an e-mail requesting address update has been received (step S121). The address update-requesting e-mail having a predetermined format is distinguishable from an ordinary e-mail different from the one requesting address update. For example, a code indicating that it is an e-mail requesting address update may be set in its heading, in which case the code may be detected for the determination. The address update-requesting e-mail has "communication resolution", "original's width" and "coding scheme" as the related information in the case where the communication method is Internet facsimile, while the e-mail having the communication method other than Internet facsimile has "S/MIME certificate" (public key) as the related information. Upon reception of the address update-requesting e-mail, the process proceeds to step S122; otherwise, the process returns to the address management processing. That is, the data reception processing is carried out on the condition that the address update-requesting e-mail is received.

In step S122, a source address indicating the source of the received e-mail requesting address update is extracted. Next, related information is extracted from the received e-mail requesting address update (step S123). Then, the local record which includes the source address extracted in step S122 is extracted from local address data 51 stored in HDD 116 (step S124). It is then determined whether the values set in the fields of the related information of the extracted local record are identical to those of the related information extracted in step S123 (step S125). If they match, the process proceeds to step S127, skipping step S126; otherwise, the process proceeds to step S126.

In step S126, the values in the fields of the related information in the local record extracted in step S124 are rewritten with those of the related information extracted from the e-mail in step S123. Specifically, for the e-mail having the communication method set to Internet facsimile, the fields of "communication resolution", "original's width" and "coding scheme" are rewritten, while for the e-mail set with the communication method other than Internet facsimile, the field of "S/MIME certificate" is rewritten. As such, local address data 51 is updated upon reception of the address update-requesting e-mail by MFP 100. This allows the related information in local address data 51 stored in MFP 100 to be adapted to that of the source.

More specifically, in the case where the source address of the address update-requesting e-mail received by MFP 100 is the e-mail address assigned to an Internet facsimile machine, local address data 51 is updated with the related information identifying the specifications of data receivable by the relevant machine in accordance with its functions. In the case where the source address of the e-mail received by MFP 100 is the one assigned to a user, local address data 51 is updated with the public key for encrypting the data attached to the e-mail. Accordingly, when data is transmitted using local address data 51, the data in the specifications adapted to the source or the encrypted data can be transmitted, as will be described later in data transmission processing with reference to FIG. 12.

It is noted that the local address data stored in other MFPs 101 and 102 are not updated at the stage of execution of the data reception processing.

In step S127, an update requesting signal is transmitted to server 200. The signal includes the source address extracted from the e-mail in step S122 and the related information extracted from the e-mail in step S123. The processing carried out in server 200 in receipt of the update requesting signal, details of which will be described later, includes updating user address data 251 in accordance with the update requesting signal and returning a response indicating the update result to MFP 100 that issued the signal. In step S128, the response transmitted from server 200 is received, and the process returns to the address management processing.

Returning to FIG. 9, following the data reception processing, it is determined in step S102 whether a login request has been accepted. If so, the process proceeds to step S103; otherwise, the process returns to step S101.

In step S103, the user requesting login is authenticated. A set of the user identification information and password input to operation portion 160B by the user is accepted, and compared with each of the sets of user identification information and passwords stored in advance in HDD 116. If HDD 116 stores the set identical to the input set of user identification information and password, it is determined that authentication succeeded; otherwise, it is determined that authentication failed. If it is determined that authentication succeeded (YES in step S104), the process proceeds to step S105; otherwise, the process returns to step S101.

In step S105, login of the authenticated user is permitted. Specifically, any operation input to operation portion 160B after the login permission is regarded as the operation by the user specified by the user identification information accepted in step S102.

Next, an address requesting signal is transmitted to server 200 (step S106). The address requesting signal includes user identification information of the user permitted to log in (i.e., the logged-in user). The processing carried out by server 200 upon reception of the address requesting signal, details of which will be described later, includes extracting the user records associated with the logged-in user from user address data 251 stored in server 200 and returning the same to MFP 100.

Thus, in the following step S107, it is determined whether the user records have been received from server 200. If so, the process proceeds to step S108; otherwise, the process proceeds to step S110. In step S108, the user records received in step S107 are stored in HDD 116 as logged-in user address data 53. Then, local address update processing is carried out (step S109). In the following step S110, data transmission processing is carried out.

Figure 11:
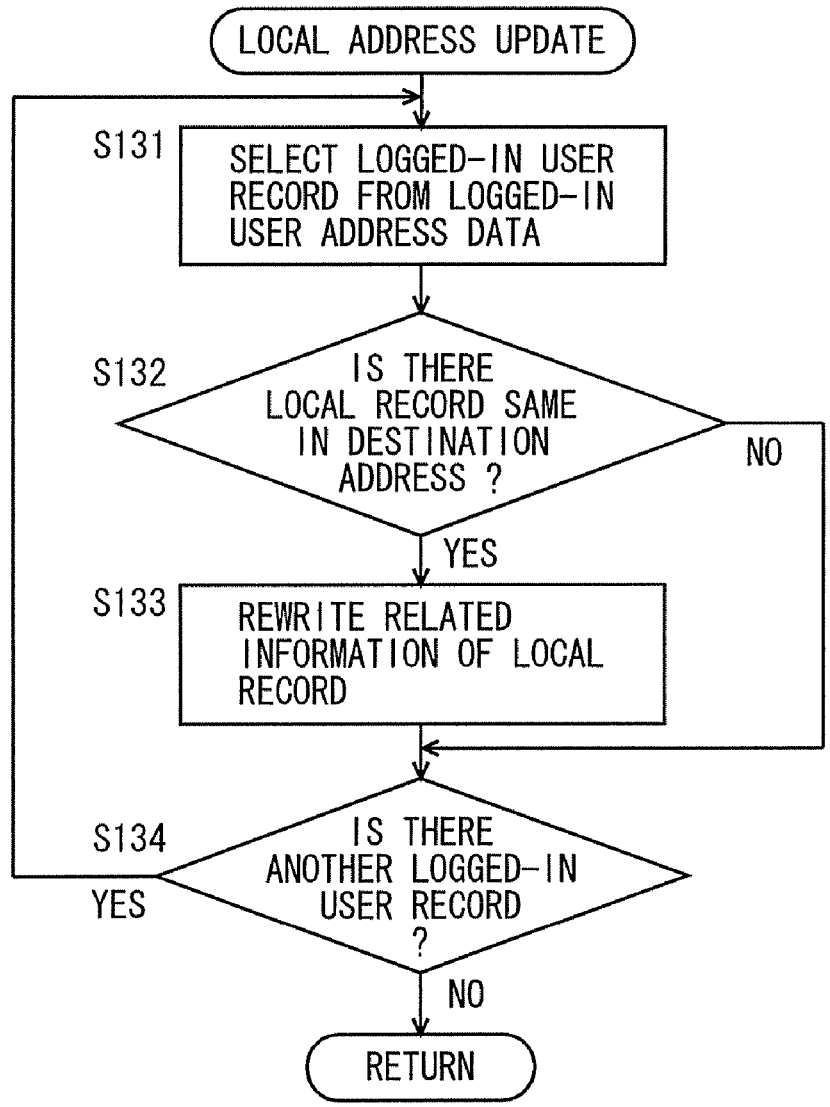
FIG. 11 is a flowchart illustrating an example of the flow of local address update processing.

FIG. 11 is a flowchart illustrating an example of the flow of the local address update processing. Referring to FIG. 11, a logged-in user record is selected as a target of processing from logged-in user address data 53 stored in HDD 116 (step S131). Next, the local record in which the e-mail address the same as that set in the "destination address" field of the selected logged-in user record is set in its "destination address" field is extracted from local address data 51 stored in HDD 116 (step S132). If such a local record is extracted, the process proceeds to step S133. If there is no such local record, the process proceeds to step S134, skipping step S133.

In step S133, the local record is updated by rewriting the values set in the fields of the related information in the local record extracted in step S132 with the values set in the fields of the related information in the logged-in user record selected as the target of processing. Next, it is determined whether there is another logged-in user record yet to be selected as a target of processing (step S134), and if so, the process returns to step S131; otherwise, the process returns to the address management processing shown in FIG. 9.

As such, when a user logs in, MFP 100 receives the user records associated with the logged-in user from server 200. It then updates local address data 51 stored in HDD 116 based on the received user records. Thus, for example in the case where an address update-requesting e-mail is received in MFP 101 and the user records included in user address data 251 stored in server 200 have been updated, local address data 51 stored in HDD 116 of MFP 100 is updated based on the updated user records. Accordingly, in the case where at least two of MFPs 100, 101 and 102 store the local address data having the same destination address set therein, if an e-mail requesting address update had been received in one of MFPs 100, 101 and 102 earlier, upon login of a user to one of the remaining MFPs, the local address data stored in the relevant MFP is updated. This eliminates the need to set the related information of local address data 51, and it is also unnecessary to transmit the address update-requesting e-mail to every one of MFPs 100, 101 and 102. All that is needed is that the destination address the same as that of the updated local record is set in one of the user records associated with the logged-in user.

Figure 12:
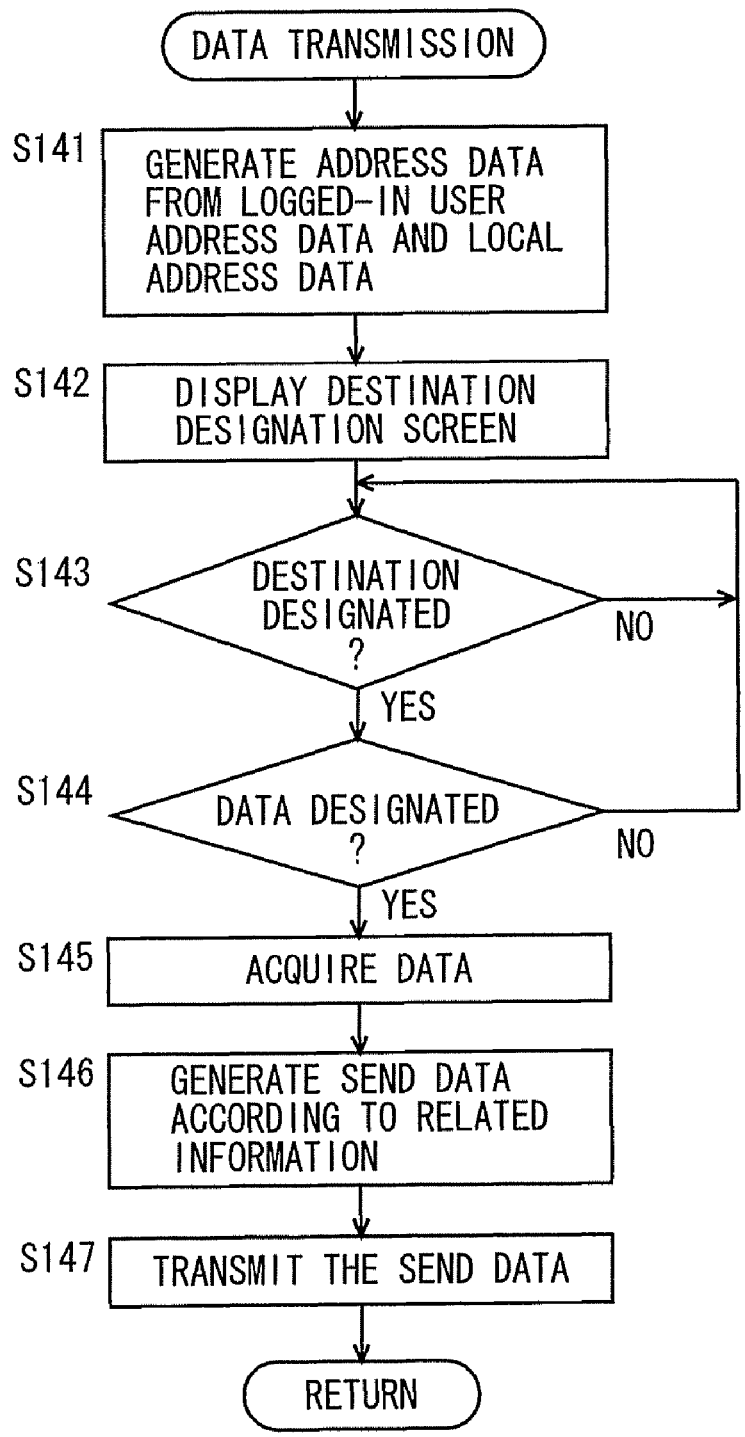
FIG. 12 is a flowchart illustrating an example of the flow of data transmission processing.

FIG. 12 is a flowchart illustrating an example of the flow of the data transmission processing, which is carried out in step S110 in FIG. 9. Referring to FIG. 12, address data is generated based on logged-in user address data 53 and local address data 51 stored in HDD 116 (step S141). The address data is generated such that it includes logged-in user records included in logged-in user address data 53 and local records included in local address data 51 and that there will be no redundant destination addresses between the local and logged-in user records. The address data may have the same format as that of local address data 51. In the presence of redundant destination addresses, the address data may be generated based on either one of them.

In step S142, a destination designation screen is generated to display the user names set in the "user name" fields in the generated address data in the form of a list, on display portion 160A. It is then determined whether a destination has been designated (step S143). When the user inputs an instruction to designate a user name to operation portion 160B in accordance with the destination designation screen displayed on display portion 160A, the designation of the destination is accepted. CPU 111 is in a standby mode until acceptance of the designation of the destination (NO in step S143), and once the designation is accepted (YES in step S143), the process proceeds to step S144.

In step S144, it is determined whether designation of data has been accepted. When the user inputs to operation portion 160B an instruction designating the data to be transmitted, the designation of data is accepted. If the designation of data is accepted, the process proceeds to step S145; otherwise, the process returns to step S143. In step S145, the data designated in step S144 is acquired. The data may include the one output by original reading portion 130 that read an original, or the one stored in HDD 116.

Next, send data is generated according to the related information (step S146). The related information refers to the values set in the fields of the related information in the user record or the local record in logged-in user address data 53 or local address data 51 stored in HDD 116, having the user name designated as the destination in step S143 set in its "user name" field.

For example, in the case where "IFAX" is set in the "type" field in the user or local record having the user name designated as the destination in step S143 set in its "user name" field, the related information refers to the values set in the "communication resolution", "original's width" and "coding scheme" fields of the related information. CPU 111 changes the data to the one having the resolution and size determined by the values set in the "communication resolution" and "original's width" fields, encodes the resultant data with the coding scheme set in the "coding scheme" field, and then generates, as the send data, the e-mail having the encoded data as its attached file and the e-mail address set in the "destination address" field as its destination.

In the case where "MAIL" is set in the "type" field of the user or local record having the user name designated as the destination in step S143 set in the "user name" field, the related information refers to the public key set in the "S/MIME certificate" of the related information. CPU 111 encrypts the data with the public key, and generates, as the send data, the e-mail having the encrypted data as its attached file and the e-mail address set in the "destination address" field as its destination.

In the following step S147, the send data generated in step S146 is transmitted, and the process returns to the address management processing shown in FIG. 9. The user only needs to select one of the displayed user names and perform an operation to designate data so that the destination address is determined and the data is transmitted. This simplifies the user's operations.

Returning to FIG. 9, in step S111, it is determined whether a logged-in user address editing instruction has been accepted. When a logged-in user address data editing button prepared in operation portion 160B is designated, the logged-in user address editing instruction is accepted. When the instruction is accepted, the process proceeds to step S112; otherwise, the process proceeds to step S113, skipping step S112. In step S112, logged-in user address editing processing is carried out, which will be described later.

In step S113, it is determined whether a local address editing instruction has been accepted. When a local address data editing button prepared in operation portion 160B is designated, the local address editing instruction is accepted. If the instruction is accepted, the process proceeds to step S114; otherwise, the process proceeds to step S115, skipping step S114. In step S114, local address editing processing is carried out, which will be described later.

In step S115, the data reception processing similar to that performed in step S101 is carried out, and the process proceeds to step S116. While the data reception processing in step S101 is carried out in the state where no user has logged in MFP 100, the data reception processing in step S115 is carried out in the state where there is a user logged in MFP 100.

In the following step S116, it is determined whether the logged-in user has logged out. When the user designates a logout button prepared in operation portion 160B, or when a predetermined period of time has passed with no operation input after permission of login, it is determined that the logged-in user has logged out. If logout of the logged-in user is detected, the process proceeds to step S117; otherwise, the process returns to step S110. In step S117, logged-in user address data 53 stored in HDD 116 is deleted, and the process returns to step S101. This allows logged-in user address data 53 including the user records associated with the logged-in user to be stored in HDD 116 only during the period when login of the logged-in user is permitted.

Figure 13:
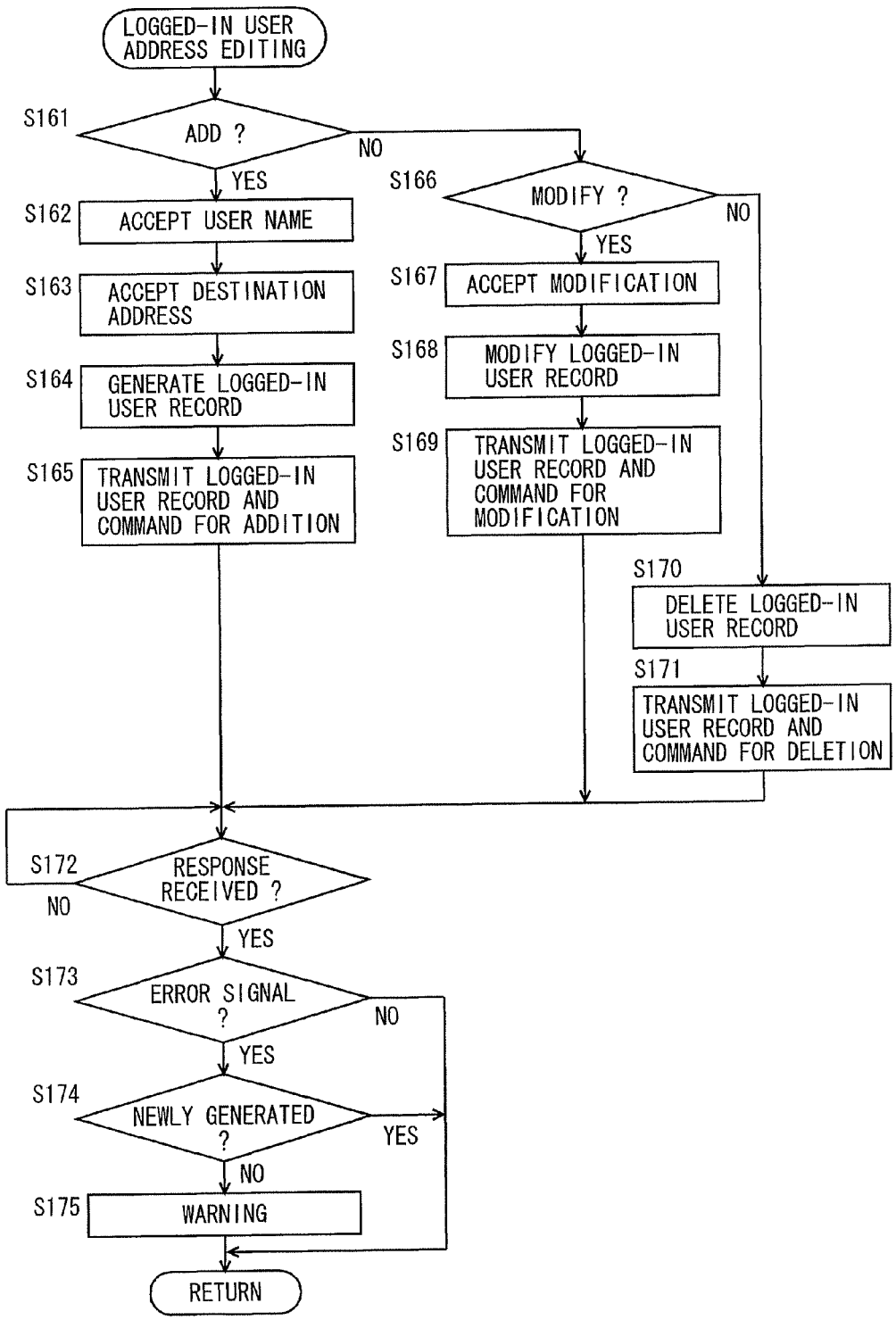
FIG. 13 is a flowchart illustrating an example of the flow of logged-in user address editing processing.

FIG. 13 is a flowchart illustrating an example of the flow of the logged-in user address editing processing, which is carried out in step S112 in FIG. 9. Referring to FIG. 13, CPU 111 determines whether an instruction to add a logged-in user record has been accepted (step S161). If the instruction to add the logged-in user record is accepted, the process proceeds to step S162; otherwise, the process proceeds to step S166. In step S166, it is determined whether an instruction to modify the logged-in user record has been accepted. If the instruction to modify the logged-in user record is accepted, the process proceeds to step S167; otherwise, the process proceeds to step S170. The case where the process proceeds to step S170 corresponds to the case where an instruction to delete the logged-in user record is accepted.

In step S162, a user name as a destination is accepted so as to generate a logged-in user record to be added. Next, a destination address is accepted (step S163). The logged-in user record is then generated (step S164). Specifically, the logged-in user record is generated by setting the user identification information of the logged-in user to the "user identification information" field, the user name accepted in step S162 to the "user name" field, the destination address accepted in step S163 to the "destination address" field, and default related information to the "related information" field.

In the following step S165, a manual update instruction signal including the generated logged-in user record and a command requesting addition is transmitted to server 200 (step S165), and the process proceeds to step S172.

On the other hand, in step S167, contents of modification are accepted. The contents of modification include the information specifying the logged-in user record included in logged-in user address data 53 stored in HDD 116, and the related information after modification. The values in the fields of the related information in the logged-in user record specified by the contents of modification are modified with those of the related information included in the contents of modification (step S168). The manual update instruction signal including the modified logged-in user record and a command requesting modification is transmitted to server 200 (step S169), and the process proceeds to step S172.

The process proceeds to step S170 when an instruction to delete the logged-in user record is accepted. The instruction to delete the logged-in user record includes the information specifying the logged-in user record included in logged-in user address data 53. Thus, in step S170, the logged-in user record specified by the instruction to delete the logged-in user record is deleted from logged-in user address data 53 stored in HDD 116. Then, the manual update instruction signal including the deleted logged-in user record and a command requesting deletion is transmitted to server 200 (step S171), and the process proceeds to step S172.

In step S172, CPU 111 is in a standby mode until a response is received from server 200 (NO in step S172), and once a response is received (YES in step S172), the process proceeds to step S173. In step S173, it is determined whether the response is an error signal. If so, the process proceeds to step S174; otherwise, the process returns to the address management processing shown in FIG. 9.

In step S174, it is determined whether the logged-in user address has newly been generated. If so, the process returns to the address management processing shown in FIG. 9; otherwise, the process proceeds to step S175. In step S175, a warning is issued, and the process returns to the address management processing shown in FIG. 9. The warning may be a warning message such as "The address data in the server has been deleted." displayed on display portion 160A, or a warning sound output from a speaker. The warning is issued in the case where after the user address data associated with the logged-in user is downloaded, the user address data, which is supposed to be stored in server 200, is deleted from server 200. This allows the logged-in user to be informed of the event that the user address data supposed to be stored in server 200 has been deleted.

Figure 14:
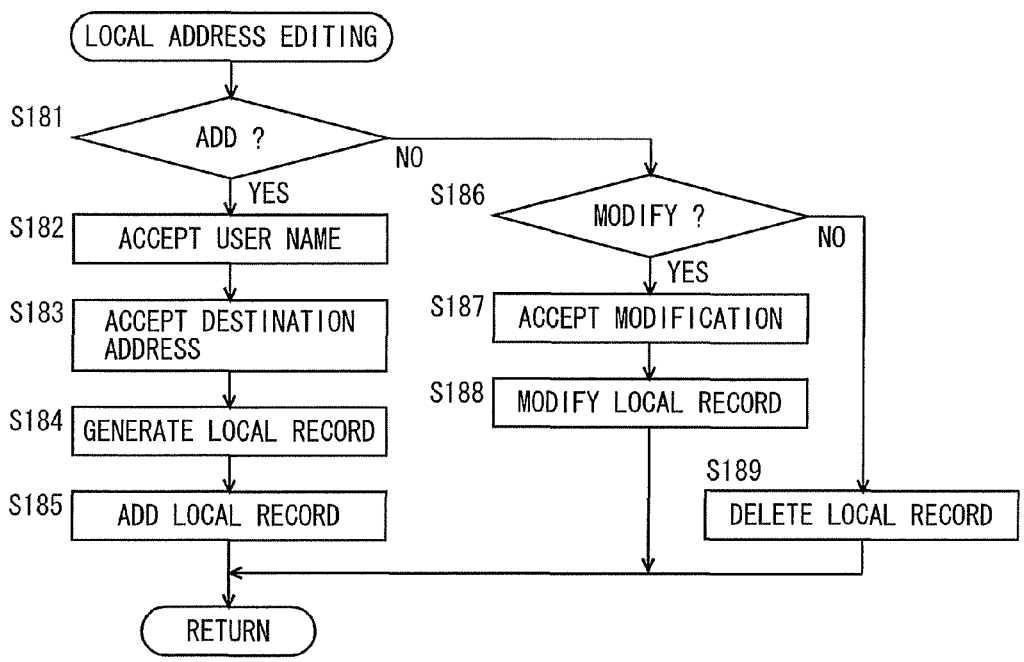
FIG. 14 is a flowchart illustrating an example of the flow of local address editing processing.

FIG. 14 is a flowchart illustrating an example of the flow of the local address editing processing, which is carried out in step S114 in FIG. 9. Referring to FIG. 14, CPU 111 determines whether an instruction to add a local record has been accepted (step S181). If the instruction to add the local record is accepted, the process proceeds to step S182; otherwise, the process proceeds to step S186. In step S186, it is determined whether an instruction to modify the local record has been accepted. If so, the process proceeds to step S187; otherwise, the process proceeds to step S189. The process proceeds to step S189 in the case where an instruction to delete the local record has been accepted.

In step S182, a user name as a destination is accepted for generating a local record to be added. Next, a destination address is accepted (step S183). A local record is then generated (step S184). Specifically, the local record is generated by setting the user name accepted in step S182 to the "user name" field, setting the destination address accepted in step S183 to the "destination address" field, and by setting default related information to the "related information" field.

In the following step S185, the generated local record is added to local address data 51 stored in HDD 116, and the process returns to the address management processing shown in FIG. 9.

In step S187, contents of modification are accepted. The contents of modification include the information specifying the local record included in local address data 51 stored in HDD 116, and the related information after modification. The "related information" field of the local record specified by the contents of modification is modified with the related information included in the contents of modification (step S188), and the process returns to the address management processing shown in FIG. 9.

The process proceeds to step S189 when an instruction to delete the local record is accepted. The instruction to delete the local record includes the information specifying the local record included in local address data 51. Thus, in step S189, the local record specified by the instruction to delete the local record is deleted from local address data 51 stored in HDD 116, and the process returns to the address management processing shown in FIG. 9.

Figure 15:
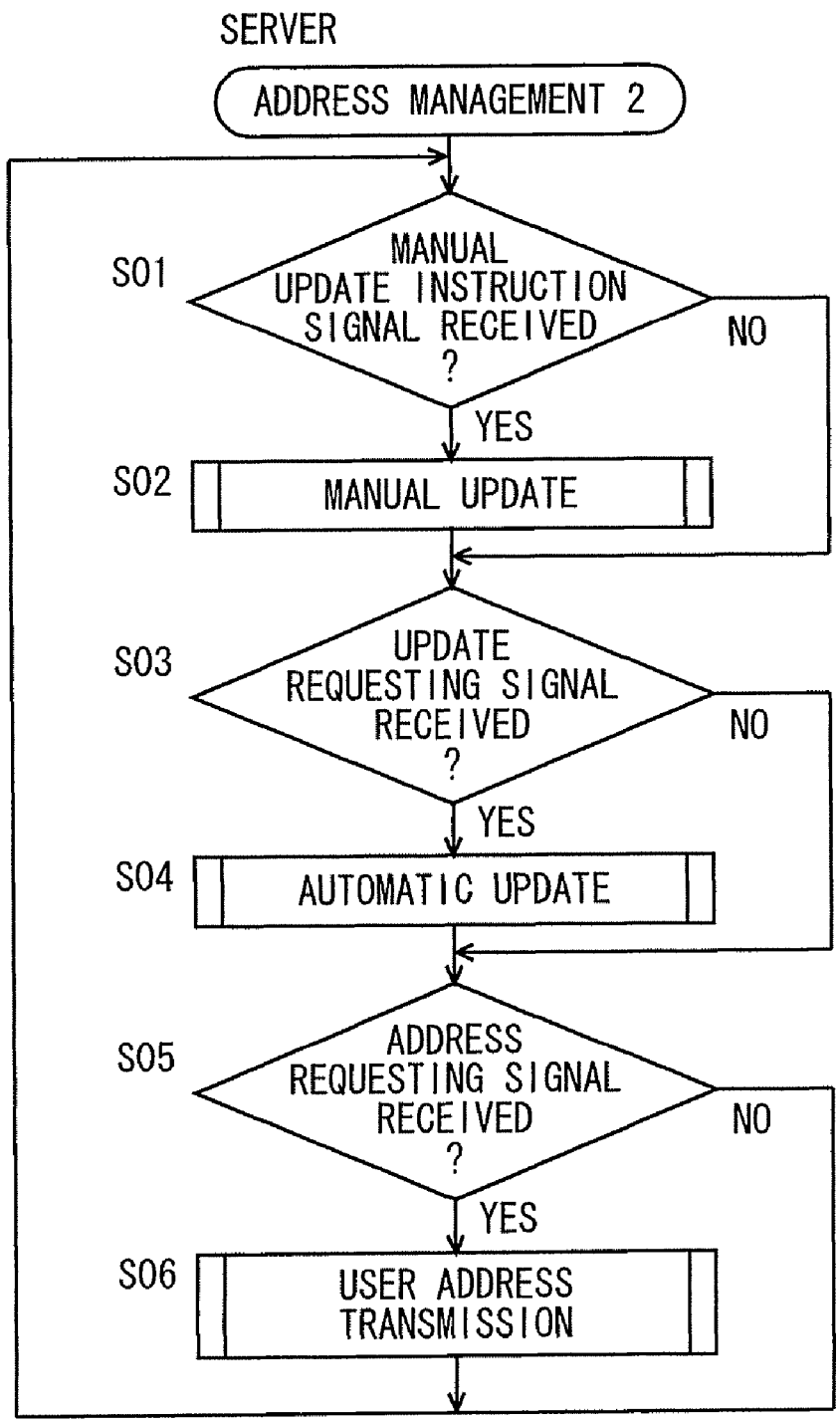
FIG. 15 is a flowchart illustrating an example of the flow of address management processing carried out in the server.

FIG. 15 is a flowchart illustrating an example of the flow of address management processing carried out in the server. The address management processing is carried out by CPU 201 provided in server 200 as CPU 201 executes the address management program. Referring to FIG. 15, CPU 201 determines whether a manual update instruction signal has been received (step S01). If the manual update instruction signal is received from one of MFPs 100, 101 and 102, the process proceeds to step S02; otherwise, the process proceeds to step S03. In step S02, manual update processing is carried out, and the process proceeds to step S03. The manual update processing will be described later.

In step S03, it is determined whether an update requesting signal has been received. If the update requesting signal has been received from one of MFPs 100, 101 and 102, the process proceeds to step S04; otherwise, the process proceeds to step S05. In step S04, automatic update processing is carried out, and the process proceeds to step S05. The automatic update processing will be described later.

In step S05, it is determined whether an address requesting signal has been received. If the address requesting signal has been received from one of MFPs 100, 101 and 102, the process proceeds to step S06; otherwise, the process returns to step S01. In step S06, user address transmission processing is carried out, and the process returns to step S01. The user address transmission processing will be described later.

Figure 16:
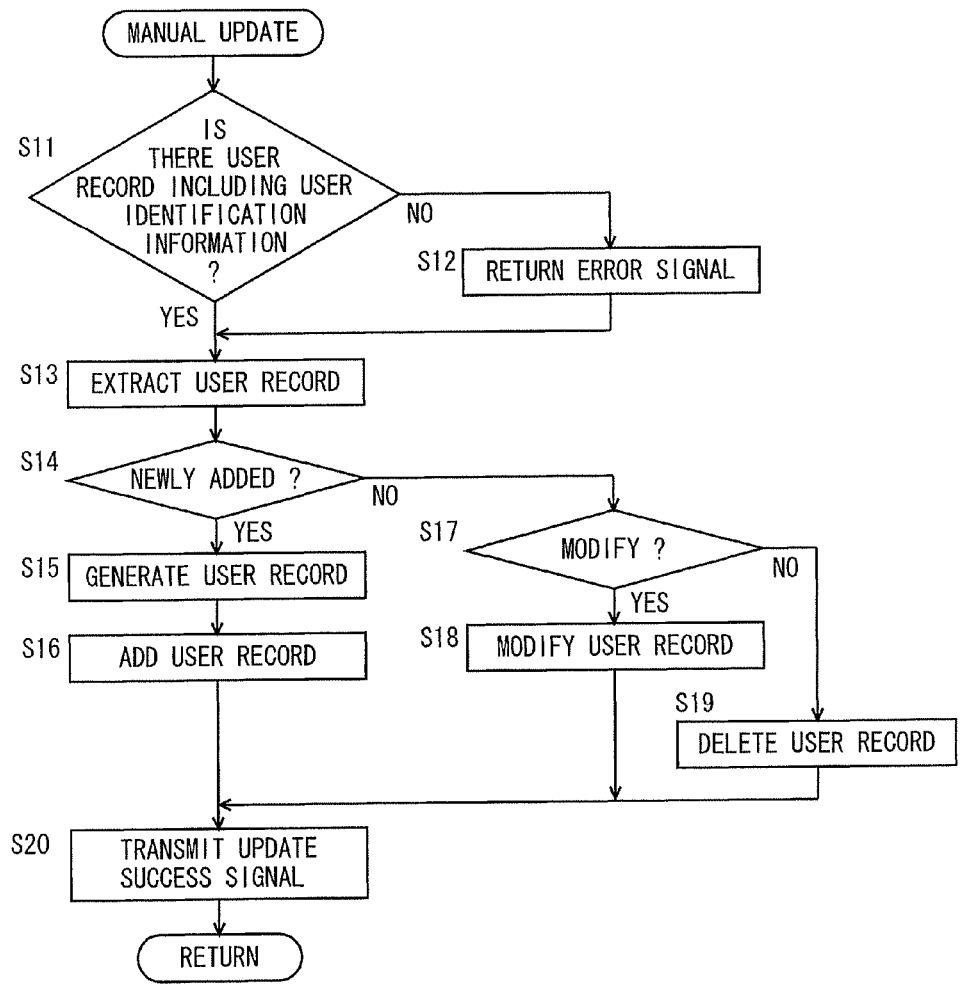
FIG. 16 is a flowchart illustrating an example of the flow of manual update processing.

FIG. 16 is a flowchart illustrating an example of the flow of the manual update processing, which is carried out in step S02 in FIG. 15 when a manual update instruction signal is received. Referring to FIG. 16, CPU 201 determines whether a user record including the user identification information included in the manual update instruction signal exists in user address data 251 stored in HDD 205 (step S11). If there is such a user record, the process proceeds to step S13; otherwise, the process proceeds to step S12. In step S12, an error signal is returned to the one of MFPs 100, 101 and 102 that issued the manual update instruction signal, and the process proceeds to step S13.

In step S13, the user record having the user identification information included in the manual update instruction signal set in the "user identification information" field is extracted from user address data 251 stored in HDD 205. If user address data 251 includes more than one user record having the user identification information included in the manual update instruction signal set in the "user identification information" field, all of the relevant user records are extracted.

In step S14, it is determined whether the command included in the manual update instruction signal is a command requesting addition. If so, the process proceeds to step S15; otherwise, the process proceeds to step S17. In step S17, it is determined whether the command included in the manual update instruction signal is a command requesting modification. If so, the process proceeds to step S18; otherwise, the process proceeds to step S19. The process proceeds to step S19 when the command included in the manual update instruction signal is a command requesting deletion.

In step S15, a user record is generated. The user record corresponds to the one included in the manual update instruction signal. The user record included in the manual update instruction signal is added to user address data 251 stored in HDD 205 (step S16), and the process proceeds to step S20. In step S20, an update success signal indicating that the update of user address data 251 succeeded is returned to the one of MFPs 100, 101 and 102 from which the manual update instruction signal was transmitted, and the process returns to the address management processing shown in FIG. 15.

In step S18, user address data 251 stored in HDD 205 is modified based on the user record included in the manual update instruction signal, and the process proceeds to step S20. Specifically, of the user records included in user address data 251 stored in HDD 205, for the user record having set therein the e-mail address the same as the one set in the "destination address" field of the user record included in the manual update instruction signal, the values set in the fields of the related information are changed to those set in the fields of the related information of the user record included in the manual update instruction signal.

In step S19, of the user records included in user address data 251 stored in HDD 205, the user record the same as the one included in the manual update instruction signal is deleted, and the process proceeds to step S20.

Figure 17:
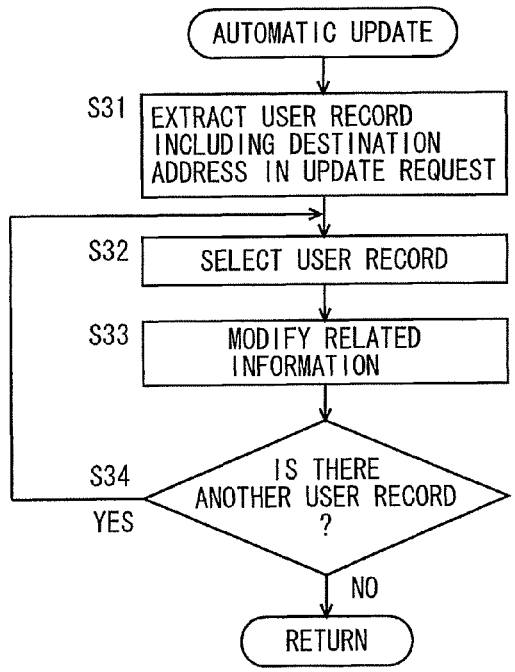
FIG. 17 is a flowchart illustrating an example of the flow of automatic update processing.

FIG. 17 is a flowchart illustrating an example of the flow of the automatic update processing, which is carried out in step S04 in FIG. 15 when an update requesting signal is received. Referring to FIG. 17, CPU 201 extracts, from user address data 251 stored in HDD 205, the user record having the e-mail address the same as the destination address included in the update requesting signal set in the "destination address" field (step S31). If user address data 251 includes more than one user record having the e-mail address the same as the destination address included in the update requesting signal set in the "destination address" field, all of those user records are extracted.

In step S32, one of the user records extracted in step S31 is selected. Then, the values set in the fields of the related information in the selected user record are changed to those of the related information included in the update requesting signal (step S33). It is then determined whether there is another user record extracted in step S31 and yet to be selected (step S34). If there is such a user record yet to be selected, the process returns to step S32; otherwise, the process returns to the address management processing shown in FIG. 15.

The automatic update processing is carried out upon reception of the update requesting signal. Execution of the automatic update processing enables the related information of a plurality of user records each having the e-mail address the same as the one included in the received update requesting signal set in the "destination address" field to be updated. Thus, in the case where user address data 251 includes a plurality of user records which are identical in destination address and different in user identification information, it is unnecessary to update the user records on the basis of user. This facilitates management of user address data 251.

Figure 18:
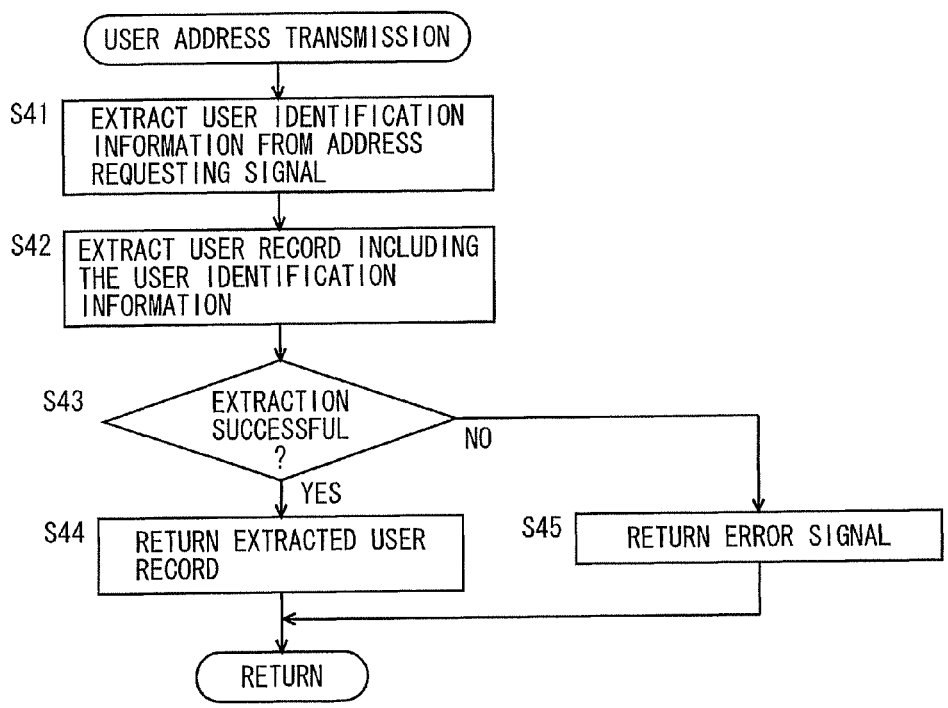
FIG. 18 is a flowchart illustrating an example of the flow of user address transmission processing.

FIG. 18 is a flowchart illustrating an example of the flow of the user address transmission processing, which is carried out in step S06 in FIG. 15 when an address requesting signal is received. Referring to FIG. 18, CPU 201 extracts user identification information included in the received address requesting signal (step S41). Then, it extracts, from user address data 251 stored in HDD 205, the user record having the extracted user identification information set in the "user identification information" field (step S42). If user address data 251 includes more than one user record having the extracted user identification information set in the "user identification information" field, all of those user records are extracted.

In step S43, it is determined whether the extraction succeeded. If at least one user record is extracted, it is determined that the extraction succeeded. In the case of success in extraction, the process proceeds to step S44; otherwise, the process proceeds to step S45.

In step S44, all the user records extracted in step S42 are returned to the one of MFPs 100, 101 and 102 from which the address requesting signal was transmitted, and the process returns to the address management processing shown in FIG. 15. In step S45, an error signal is returned to the one of MFPs 100, 101 and 102 that issued the address requesting signal, and the process returns to the address management processing shown in FIG. 15.

As described above, data communication system 1 of the present embodiment includes server 200 serving as the address management apparatus and MFPs 100, 101 and 102 serving as the data communication apparatuses, which are capable of communicating with each other. Server 200 stores user address data 251 in HDD 205. When one of MFPs 100, 101 and 102 receives an e-mail requesting address update from another apparatus, it transmits an update request, including the source address indicating the address from which the e-mail was transmitted and the related information on the source included in the e-mail, to server 200. Upon reception of the update request, server 200 rewrites the related information associated with the relevant source address by user address data 251 with the related information included in the update request, so that the user address data can be updated every time one of MFPs 100, 101 and 102 receives an address update-requesting e-mail.

Further, server 200 stores user address data 251 for each user, and when it receives the update request from one of MFPs 100, 101 and 102, it rewrites all the related information associated with the relevant source address by user address data 251 with the related information included in the update request. Accordingly, in the case where user address data 251 includes a plurality of user records which are associated with a plurality of users, respectively, and which have their destination addresses identical to the relevant source address, it is possible to update all of those user records at one time.

Further, MFPs 100, 101 and 102 each store local address data 51 in HDD 116. In response to reception of an e-mail requesting address update, a respective MFP rewrites the related information associated with the destination address included in the e-mail by local address data 51, with the related information included in the user record, and in response to reception of a user record from server 200, it rewrites the related information associated with the destination address included in the user record by local address data 51, with the related information associated with the destination address by the received user record. This increases the frequency of updating of the local address data, so that the local address data can be brought up to date. The user record received from server 200 has its related information rewritten in response to the event that server 200 receives the update request that one of MFPs 100, 101 and 102 issues when it receives an address update-requesting e-mail from another apparatus, which ensures that local address data 51 is updated with the latest user record. Accordingly, it is possible to update local address data 51 with the latest user record.

Further, when a user is authenticated in one of MFPs 100, 101 and 102, logged-in user address data 53 is stored in HDD 116 in the one of MFPs 100, 101 and 102 which permitted the user login. Thereafter, when user address data 251 stored in server 200 is deleted and logged-in user address data 53 is updated in the one of MFPs 100, 101 and 102 which permitted the user login, a warning message is displayed. This allows the user to be informed of the event that user address data 251 stored in server 200 has been deleted.

While MFPs 100, 101 and 102 and server 200 included in data communication system 1 have been described in the above embodiment, the present invention may of course be understood as an address management method for carrying out the address management processing shown in FIGS. 9-14 and the address management processing shown in FIGS. 15-18, or as an address management program for causing computers to carry out the address management method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data communication system including an address management apparatus and a data communication apparatus capable of communicating with each other, said address management apparatus comprising:
a destination storage portion to store address data having a destination address indicating an address of a destination and related information on said destination associated with each other, said data communication apparatus comprising:
a data receiving portion to receive data from another apparatus;
a local storage portion to store local address data having a destination address indicating an address of a destination and related information on said destination associated with each other;
the data received from the another apparatus having a source address indicating an address of a source and related information about said source,
a first local updating portion, in response to reception of the data by said data receiving portion, to rewrite said related information associated with the destination address in said local address data stored in said local storage portion corresponding to the source address included in said received data with the related information included in said received data;
an update requesting portion, in response to reception of the data by said data receiving portion, to transmit an update request to said address management apparatus, said update request including the source address indicating an address of a source of the data received by said data receiving portion and related information on the source included in the data;
an address data acquiring portion to transmit an address request to said address management apparatus and receive said address data from said address management apparatus; and
a data transmitting portion to transmit data to said destination address included in said received address data,
said address management apparatus further comprising:
an updating portion, in response to reception of said update request from said data communication apparatus, to rewrite said related information associated with the destination address in the address data stored in said destination storage portion corresponding to said source address included in the update request with said related information included in said update request,
said data communication apparatus further comprises:
a second local updating portion, in response to reception of said address data from said address management apparatus by said address data acquiring portion, to rewrite said related information associated with said destination address included in said received address data by said local address data stored in said local storage portion with said related information associated with said destination address by said received address data, wherein
said data transmitting portion in said data communication apparatus transmits data to said destination address included in said received address data or said local address data.

2. The data communication system according to claim 1, wherein
said destination storage portion in said address management apparatus stores a plurality of pieces of said address data for respective users,
said data communication apparatus further comprising:
an authentication portion to authenticate a user,
said address data acquiring portion in said data communication apparatus transmits an address request including user identification information for identification of said authenticated user to said address management apparatus and receives said address data stored in association with said authenticated user from said address management apparatus.

3. The data communication system according to claim 2, wherein
said data communication apparatus further comprises:
a login permitting portion to permit login of the user authenticated by said authentication portion; and
a discarding portion to discard said received address data when permission by said login permitting portion is cancelled.

4. The data communication system according to claim 2, wherein
said data communication apparatus further comprises:
an update instruction accepting portion to accept an update instruction for updating said received address data; and a manual update instruction transmitting portion to transmit a manual update instruction to said address management apparatus, said manual update instruction including user identification information of said authenticated user and said accepted update instruction, said address management apparatus further comprises:
a manual updating portion, in response to reception of said manual update instruction, to update one of said plurality of pieces of said address data stored in said destination storage portion associated with the user corresponding to the user identification information included in said manual update instruction according to said update instruction included in said manual update instruction;
a deleting portion to delete said address data stored in said destination storage portion; and
an update result transmitting portion to return an error signal in the case where said address data to be updated by said manual updating portion is not stored in said destination storage portion by having been deleted by said deleting portion, and said data communication apparatus further comprises:
a warning portion to issue a warning in the case where said error signal is received after reception of said address data.

5. The data communication system according to claim 2, wherein,
in the case where said source address included in said received update request is associated with a plurality of said related information by a plurality of said address data stored in said destination storage portion, said updating portion in said address management apparatus rewrites all of said plurality of pieces of related information with said related information included in said update request.

6. The data communication system according to claim 1, wherein said related information includes a specification for transmission of data.

7. A data communication apparatus capable of communicating with an address management apparatus, comprising:
a data receiving portion to receive data from another apparatus;
an update requesting portion, in response to reception of the data by said data receiving portion, to transmit an update request to said address management apparatus, said update request including a source address indicating an address of a source of said received data and related information included in the data;
an address data acquiring portion to transmit an address request to said address management apparatus and receive address data stored in said address management apparatus from said address management apparatus, said address data having a destination address indicating an address of a destination and related information on said destination associated with each other;
a local storage portion to store local address data having a destination address indicating an address of a destination and related information on said destination associated with each other;
a first local updating portion, in response to reception of the data by said data receiving portion, to rewrite said related information associated with the destination address in said local address data stored in said local storage portion corresponding to the source address included in said received data with the related information included in said received data;

a second local updating portion, in response to reception of said address data from said address management apparatus by said address data acquiring portion, to rewrite said related information associated with said destination address included in said received address data in said local address data stored in said local storage portion with said related information associated with said destination address by said received address data; and
a data transmitting portion to transmit data to at least any one of said destination addresses included in said received address data or said local address data.

8. The data communication apparatus according to claim 7, wherein
a plurality of pieces of said address data are stored in said address management apparatus for respective users,
said data communication apparatus further comprises:
an authentication portion to authenticate a user, and
said address data acquiring portion transmits an address request including user identification information for identification of said authenticated user to said address management apparatus, and receives said address data stored in association with said authenticated user from said address management apparatus.

9. The data communication apparatus according to claim 8, further comprising:
a login permitting portion to permit login of the user authenticated by said authentication portion; and
a discarding portion to discard said received address data when permission by said login permitting portion is cancelled.

10. The data communication apparatus according to claim 8, further comprising
an update instruction accepting portion to accept an update instruction for updating said received address data;
a manual update instruction transmitting portion to transmit a manual update instruction to said address management apparatus, said manual update instruction including user identification information of said authenticated user and said accepted update instruction; and
a warning portion to issue a warning when an error signal is received from said address management portion in response to transmission of said manual update instruction after reception of said address data, said error signal being transmitted by said address management apparatus in the case where said address data stored in said address management apparatus does not include the address data associated with the user corresponding to the user identification information included in said manual update instruction.

11. An address management method carried out by a data communication apparatus capable of communicating with an address management apparatus, comprising the steps of:
receiving data from another apparatus;
in response to reception of the data from said other apparatus, transmitting an update request to said address management apparatus, said update request including a source address indicating an address of a source of said received data and related information included in the data;
transmitting an address request to said address management apparatus and receiving address data stored in said address management apparatus from said address management apparatus, said address data having a destination address indicating an address of a destination and related information on said destination associated with each other;

storing local address data having a destination address indicating an address of a destination and related information on said destination associated with each other;

in response to reception of the data from said other apparatus, rewriting said related information associated with the destination address in said stored local address data corresponding to the source address included in said received data with the related information included in said received data;

in response to reception of said address data from said address management apparatus, rewriting said related information associated with said destination address included in said received address data in said stored local address data with said related information associated with said destination address by said received address data; and transmitting data to at least any one of said destination addresses included in said received address data or said local address data.

12. The address management method according to claim 11, wherein
said plurality of pieces of said address data are stored in said address management apparatus for respective users, said address management method further comprising the step of authenticating a user, and
the step of receiving from said address management apparatus includes the step of transmitting an address request including user identification information for identification of said authenticated user, and the step of receiving said address data stored in association with said authenticated user from said address management apparatus.

13. The address management method according to claim 12, further comprising the steps of:
permitting login of the user authenticated in said step of authenticating; and
in said step of permitting login, discarding said received address data when permission is cancelled.

14. The address management method according to claim 12, further comprising the steps of:
accepting an update instruction for updating said received address data;
transmitting a manual update instruction to said address management apparatus, said manual update instruction including user identification information of said authenticated user and said accepted update instruction, and
issuing a warning when an error signal is received from said address management portion in response to transmission of said manual update instruction after reception of said address data, said error signal being transmitted by said address management apparatus in the case where said address data stored in said address management apparatus does not include the address data associated with the user corresponding to the user identification information included in said manual update instruction.

15. A non-transitory computer-readable recording medium encoded with an address management program executed by a computer controlling a data communication apparatus capable of communicating with an address management apparatus, the program causing said computer to perform processing comprising the steps of:
receiving data from another apparatus;
in response to reception of the data from said other apparatus, transmitting an update request to said address management apparatus, said update request including a source address indicating an address of a source of said received data and related information included in the data;

transmitting an address request to said address management apparatus and receiving address data stored in said address management apparatus from said address management apparatus, said address data having a destination address indicating an address of a destination and related information on said destination associated with each other;

storing local address data having a destination address indicating an address of a destination and related information on said destination associated with each other;

in response to reception of the data from said other apparatus, rewriting said related information associated with the destination address in said stored local address data corresponding to the source address included in said received data with the related information included in said received data;

in response to reception of said address data from said address management apparatus, rewriting said related information associated with said destination address included in said received address data in said stored local address data with said related information associated with said destination address by said received address data; and transmitting data to at least any one of said destination addresses included in said received address data or said local address data.

16. The non-transitory computer-readable recording medium according to claim 15, wherein
said plurality of pieces of said address data are stored in said address management apparatus for respective users, said address management program further causing said computer to execute the step of authenticating a user, and
the step of receiving from said address management apparatus includes the step of transmitting an address request including user identification information for identification of said authenticated user, and the step of receiving said address data stored in association with said authenticated user from said address management apparatus.

17. The non-transitory computer-readable recording medium according to claim 16, further comprising the steps of:
permitting login of the user authenticated in said step of authenticating; and
in said step of permitting login, discarding said received address data when permission is cancelled.

18. The non-transitory computer-readable recording medium according to claim 16, further comprising the steps of:
accepting an update instruction for updating said received address data;
transmitting a manual update instruction to said address management apparatus, said manual update instruction including user identification information of said authenticated user and said accepted update instruction; and
issuing a warning when an error signal is received from said address management portion in response to transmission of said manual update instruction after reception of said address data, said error signal being transmitted by said address management apparatus in the case where said address data stored in said address management apparatus does not include the address data associated with the user corresponding to the user identification information included in said manual update instruction.

* * * * *